US011719912B2

(12) United States Patent
Song et al.

(10) Patent No.: US 11,719,912 B2
(45) Date of Patent: Aug. 8, 2023

(54) OPTICAL IMAGING SYSTEM

(71) Applicant: Zhejiang Sunny Optical Co., Ltd, Ningbo (CN)

(72) Inventors: Litong Song, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 418 days.

(21) Appl. No.: 16/917,259

(22) Filed: Jun. 30, 2020

(65) Prior Publication Data
US 2021/0026109 A1    Jan. 28, 2021

(30) Foreign Application Priority Data
Jul. 24, 2019   (CN) .......................... 201910671727.5

(51) Int. Cl.
*G02B 13/00*        (2006.01)
*G02B 9/62*         (2006.01)
(52) U.S. Cl.
CPC ........... *G02B 13/0045* (2013.01); *G02B 9/62* (2013.01)

(58) Field of Classification Search
CPC ........ G02B 13/18; G02B 13/06; G02B 13/04; G02B 13/0045; G02B 15/146; G02B 9/62; G02B 9/64; G02B 27/0025; H04N 5/2254; H04N 5/222
USPC ......... 359/656–658, 708, 713, 749, 756–762
See application file for complete search history.

(56) References Cited

FOREIGN PATENT DOCUMENTS

KR      20170054335 A  *  4/2017   ............... G02B 9/62

\* cited by examiner

*Primary Examiner* — Travis S Fissel
(74) *Attorney, Agent, or Firm* — Sughrue Mion, PLLC

(57) ABSTRACT

The present disclosure discloses an optical imaging system including, sequentially from an object side to an image side along an optical axis, a first lens having a negative refractive power, and an image-side surface thereof being concave; a second lens having a refractive power; a third lens having a positive refractive power, and an object-side surface thereof being convex and an image-side surface thereof being convex; a fourth lens having a negative refractive power; a fifth lens having a refractive power, and an image-side surface thereof being convex; and a sixth lens having a refractive power, wherein half of a maximum field-of-view Semi-FOV of the optical imaging system satisfies Semi-FOV>60°; and a maximum effective radius DT12 of the image-side surface of the first lens and a maximum effective radius DT62 of an image-side surface of the sixth lens satisfy 0.5<DT12/DT62<1.

18 Claims, 9 Drawing Sheets

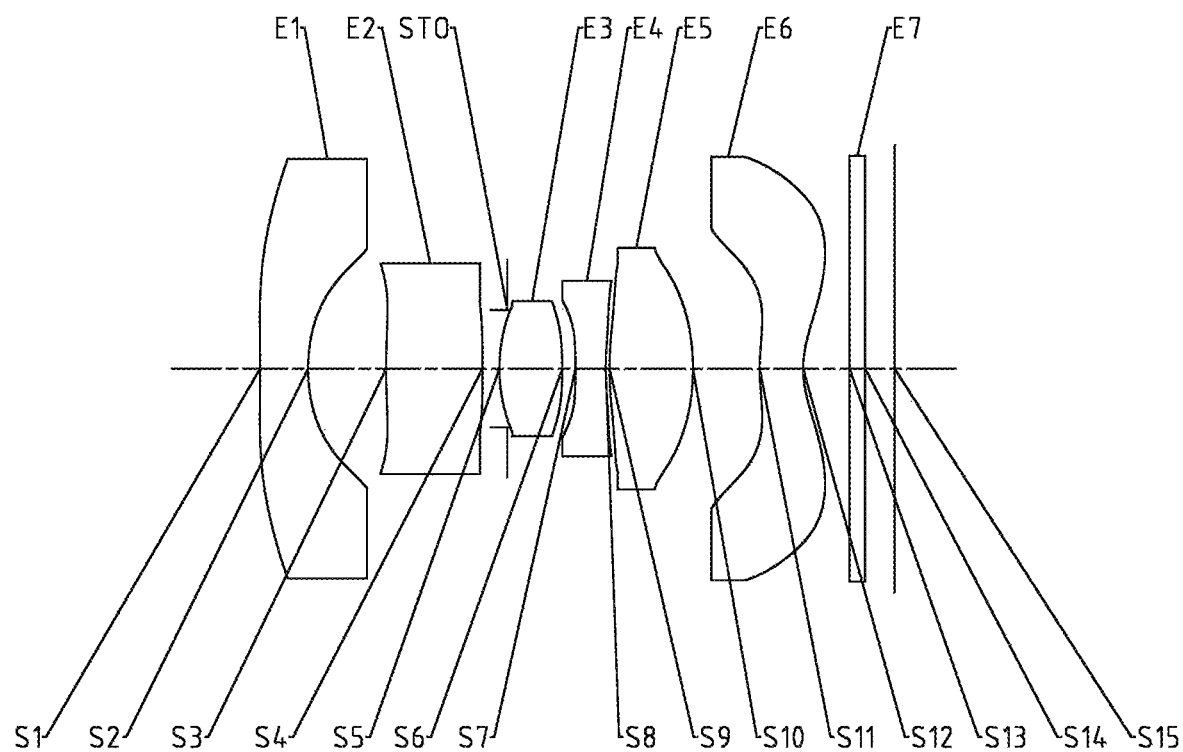
Fig. 5
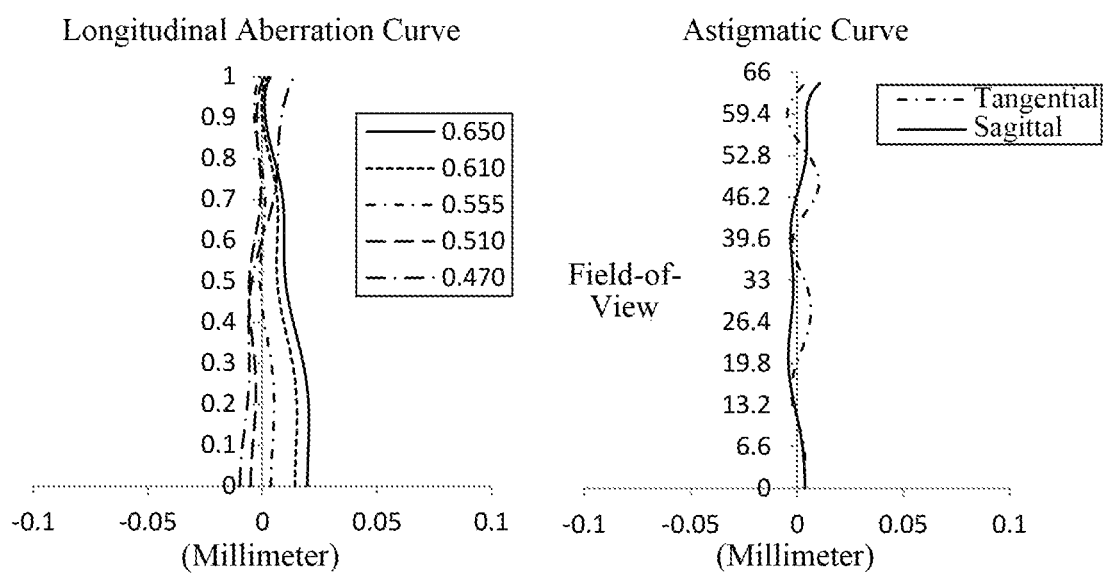
Fig. 6A
Fig. 6B

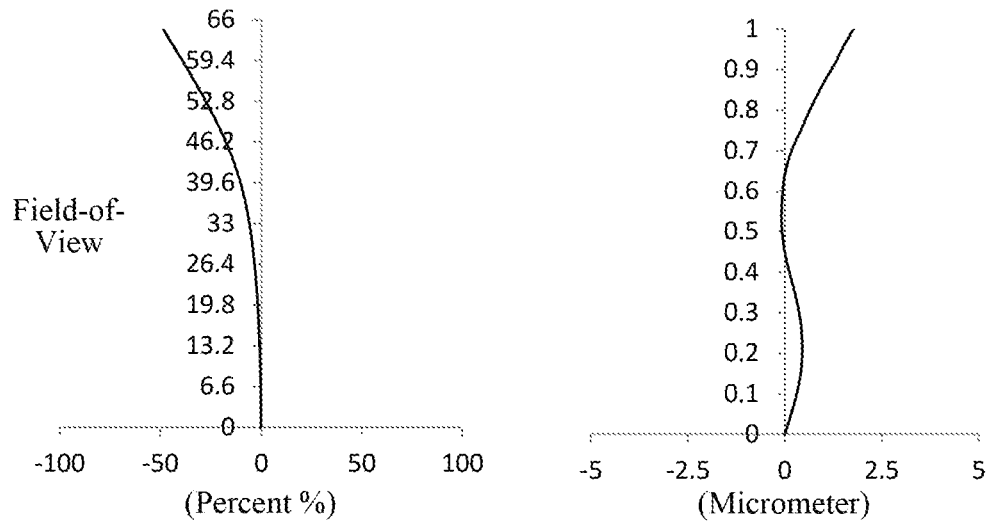
Fig. 6C
Fig. 6D
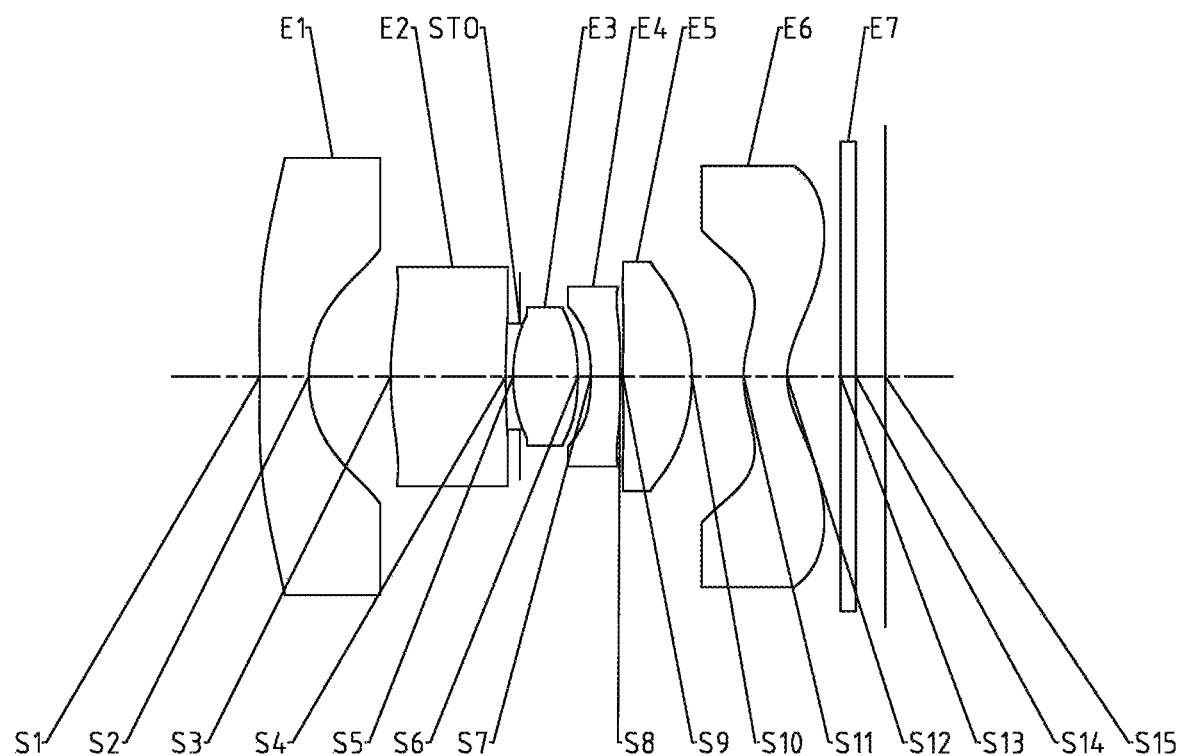
Fig. 7

OPTICAL IMAGING SYSTEM

CROSS-REFERENCE TO RELATED APPLICATION

This application claims benefit of priority to Chinese Patent Application No. 201910671727.5 filed on Jul. 24, 2019 before the China National Intellectual Property Administration, the entire disclosure of which is incorporated herein by reference in its entity.

TECHNICAL FIELD

The present disclosure relates to an optical imaging system, and more particularly, to an optical imaging system including a six-piece lens.

BACKGROUND

In recent years, with the development of science and technology, the demand for imaging systems suitable for portable electronic products has gradually increased. The rapid development of mobile phone imaging systems, especially the popularization of large-size, high-pixel CMOS chips, makes mobile phone manufacturers put forward more stringent requirements on imaging quality of imaging systems. In addition, with the improvement of the performance as well as the reduction of the size of the CCD and CMOS elements, a higher demand is also placed on the high imaging quality and miniaturization of the corresponding imaging system.

In recent years, wide-angle lenses are widely used in various fields, and are often used for important functions such as panoramic high-definition image shooting, object positioning, tracking and capturing and the like. In order to meet the miniaturization requirement and meet the imaging requirement, there is a need for an optical imaging system capable of combining miniaturization with ultra-wide angle and high resolution.

SUMMARY

The present disclosure provides an optical imaging system that is applicable to portable electronic products and at least solves or partially solves at least one of the above disadvantages of the prior art.

The present disclosure provides an optical imaging system which includes, sequentially from an object side to an image side along an optical axis, a first lens having a negative refractive power, wherein an image-side surface thereof may be concave; a second lens having a refractive power; a third lens having a positive refractive power, wherein an object-side surface thereof may be convex and an image-side surface thereof may be convex; a fourth lens having a negative refractive power; a fifth lens having a refractive power, wherein an image-side surface thereof may be convex; and a sixth lens having a refractive power.

In one embodiment, the second lens may have a positive refractive power.

In one embodiment, an object-side surface of the second lens may be convex.

In one embodiment, an object-side surface of the fourth lens may be concave.

In one embodiment, the sixth lens may have a negative refractive power.

In one embodiment, half of a maximum field-of-view Semi-FOV of the optical imaging system may satisfy Semi-FOV>60°.

In one embodiment, a maximum effective radius DT12 of the image-side surface of the first lens and a maximum effective radius DT2 of an image-side surface of the sixth lens may satisfy $0.5<DT12/DT62<1$.

In one embodiment, an effective focal length f of the optical imaging system and half of a diagonal length ImgH of an effective pixel region on the imaging plane of the optical imaging system may satisfy $f/ImgH>0.6$.

In one embodiment, an on-axis distance SAG41 from an intersection of an object-side surface of the fourth lens and the optical axis to a vertex of an effective radius of the object-side surface of the fourth lens and an on-axis distance SAG52 from an intersection of the image-side surface of the fifth lens and the optical axis to a vertex of an effective radius of the image-side surface of the fifth lens may satisfy $0.2<SAG41/SAG52<0.7$.

In one embodiment, an on-axis distance SAG12 from an intersection of the image-side surface of the first lens and the optical axis to a vertex of an effective radius of the image-side surface of the first lens and an edge thickness ET1 of the first lens may satisfy $0.5<SAG12/ET1<1$.

In one embodiment, an edge thickness ET2 of the second lens and an edge thickness ET3 of the third lens may satisfy $0.2<ET3/ET2<0.7$.

In one embodiment, an effective focal length f of the optical imaging system and an effective focal length f1 of the first lens may satisfy $-1<f/f1<-0.5$.

In one embodiment, an effective focal length f of the optical imaging system, an effective focal length f2 of the second lens, and an effective focal length f3 of the third lens may satisfy $0.5<f/f3-f/f2<1$.

In one embodiment, an effective focal length f of the optical imaging system and a combined focal length f2345 of the second lens, the third lens, the fourth lens, and the fifth lens may satisfy $0.5<f/f2345<1.5$.

In one embodiment, an effective focal length f4 of the fourth lens and an effective focal length f5 of the fifth lens may satisfy $-1<f5/f4<-0.5$.

In one embodiment, an effective focal length f of the optical imaging system, a radius of curvature R2 of the image-side surface of the first lens, and a radius of curvature R3 of an object-side surface of the second lens may satisfy $0.2<f/(R3-R2)<1.2$.

In one embodiment, a radius of curvature R5 of the object-side surface of the third lens and a radius of curvature R6 of the image-side surface of the third lens may satisfy $0.2<R5/(R5-R6)<0.7$.

In one embodiment, a radius of curvature R7 of an object-side surface of the fourth lens and a radius of curvature R10 of the image-side surface of the fifth lens may satisfy $0.5<R7/(R7+R10)<1$.

In one embodiment, an effective focal length f of the optical imaging system and a radius of curvature R12 of an image-side surface of the sixth lens may satisfy $0.2<R12/f<1.2$.

In one embodiment, a center thickness CT1 of the first lens along the optical axis and a center thickness CT2 of the second lens along the optical axis may satisfy $0.3<CT1/CT2<0.8$.

In one embodiment, a center thickness CT3 of the third lens along the optical axis, a center thickness CT4 of the fourth lens along the optical axis, and a sum ΣAT of the spaced intervals between each two adjacent lenses of the first lens to the sixth lens along the optical axis may satisfy $0.3<(CT3+CT4)/\Sigma AT<0.8$.

In one embodiment, a center thickness CT5 of the fifth lens along the optical axis, a center thickness CT6 of the sixth lens along the optical axis, and a spaced interval T56 between the fifth lens and the sixth lens along the optical axis may satisfy $0.2<T56/(CT5+CT6)<0.7$.

The present disclosure uses six lenses, and the optical imaging system has at least one advantageous effect such as small aperture, large viewing angle, high resolution, and the like by rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings:

FIG. 5 shows a schematic structural diagram of an optical imaging system according to Example 3 of the present disclosure;

FIGS. 6A to 6D show a longitudinal aberration curve, an astigmatic curve, a distortion curve and a lateral color curve, respectively, of the optical imaging system of Example 3;

FIG. 7 is a schematic structural diagram of an optical imaging system according to Example 4 of the present disclosure;

DETAILED DESCRIPTION OF EMBODIMENTS

Figure 1:
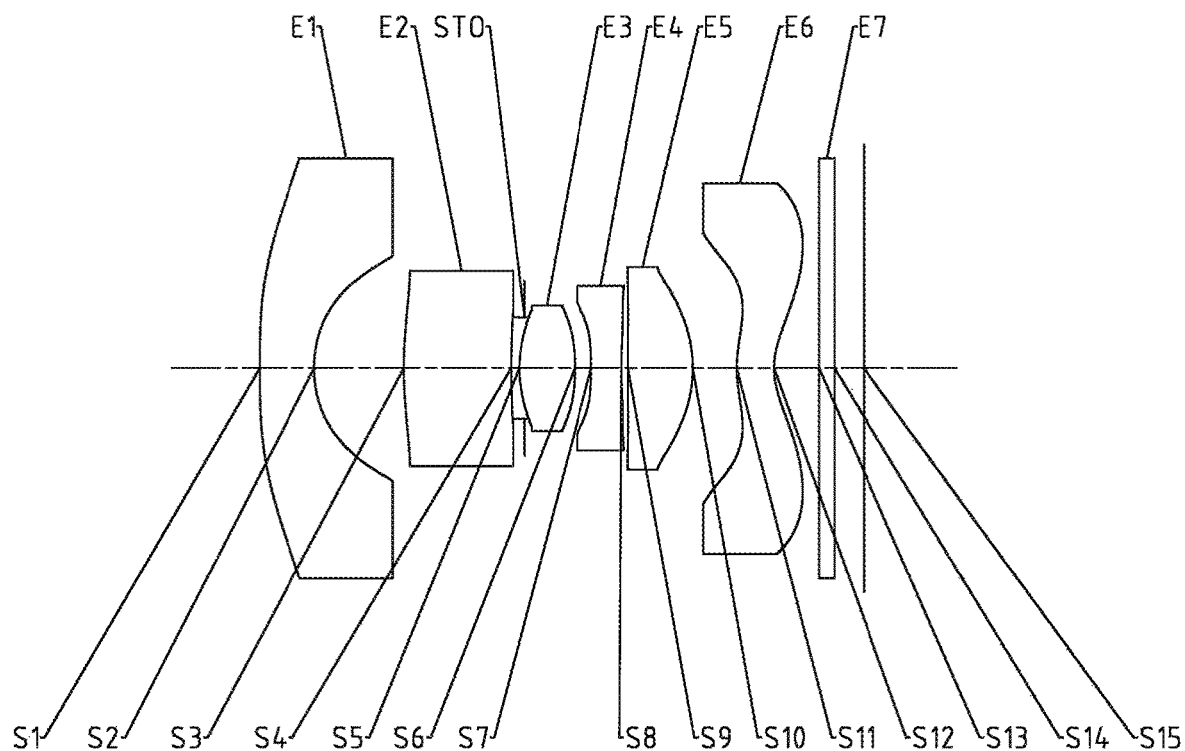
FIG. 1 shows a schematic structural diagram of an optical imaging system according to Example 1 of the present disclosure.

For a better understanding of the present disclosure, various aspects of the present disclosure will be described in more detail with reference to the accompanying drawings. It is to be understood that these detailed descriptions are merely illustrative of exemplary embodiments of the present disclosure and are not intended to limit the scope of the present disclosure in any way. Throughout the specification, like reference numerals refer to like elements. The expression "and/or" includes any and all combinations of one or more of the associated listed items.

It should be noted that, in the present specification, the expressions such as first, second, third are used merely for distinguishing one feature from another feature, without indicating any limitation on the feature. Thus, the first lens discussed below may also be referred to as a second lens or a third lens without departing from the teachings of the present disclosure.

In the drawings, the thickness, size and shape of the lens have been slightly exaggerated for ease of illustration. In particular, shapes of spherical surfaces or aspheric surfaces shown in the drawings are shown by way of example. That is, shapes of spherical surfaces or aspheric surfaces are not limited to the shapes of the spherical surfaces or the aspheric surfaces shown in the drawings. The drawings are merely illustrative and not strictly drawn to scale.

Herein, the paraxial region refers to a region near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. The surface of each lens closest to the subject is referred to as the object-side surface of the lens, and the surface of each lens closest to the imaging plane is referred to as the image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms, including technical and scientific terms, used herein have the same meaning as commonly understood by one of ordinary skill in the art to which the present disclosure belongs. It is also to be understood that terms, such as those defined in commonly used dictionaries, are to be interpreted as having a meaning that is consistent with the meaning in the context of the related art and will not be interpreted in an idealized or overly formal sense, unless expressly so defined herein.

It should be noted that the examples in the present disclosure and the features in the embodiments may be combined with each other on a non-conflict basis. The present disclosure will now be described in detail with reference to the accompanying drawings and in combination with the examples.

The features, principles, and other aspects of the present disclosure are described in detail below.

An optical imaging system according to an exemplary embodiment of the present disclosure may include, for example, six lenses having refractive power, that is, a first lens, a second lens, a third lens, a fourth lens, a fifth lens, and a sixth lens. The six lenses are arranged sequentially along the optical axis from an object side to an image side. Among the first lens to the sixth lens, there may be air spaces between each two adjacent lenses.

In an exemplary embodiment, the first lens may have a negative refractive power, and an image-side surface thereof may be concave; the second lens may have a positive refractive power or a negative refractive power; the third lens may have a positive refractive power, and an object-side surface thereof may be convex and an image-side surface thereof may be convex; the fourth lens may have a negative refractive power; the fifth lens may have a negative refractive power or a positive refractive power, and an image-side surface thereof may be a convex surface; and the sixth lens may have a positive refractive power or a negative refractive power. By reasonably controlling the positive and negative distribution of the refractive power and curvature radius of lens surface of each component of the optical imaging system, the aberrations of the control system are effectively offset, so that the optical imaging system has a high imaging quality.

In an exemplary embodiment, the second lens may have a positive refractive power and the object-side surface of the second lens may be convex; an object-side surface of the fourth lens may be concave; and the sixth lens may have a negative refractive power. By further controlling the positive and negative distribution of the refractive power and curvature radius of lens surface of the each component of the optical imaging system, the spherical aberration and coma of the optical imaging system are advantageously offset, while the risk of ghosting in the optical imaging system may be reduced, thereby improving the imaging performance of the optical imaging system.

In an exemplary embodiment, the optical imaging system of the present disclosure may satisfy the conditional Semi-FOV>60 ay satisfy the conditionalof a maximum field-of-view of the optical imaging system. More specifically, Semi-FOV may satisfy 63°<Semi-FOV<70 Vi-he optical imaging>60 Vi-he optical imaging system. More specifically, Semi-FOV may In an exemplary embodiment, the optical imaging system of the present disclosure may satisfy the conditional 0.5<DT12/DT62<1, where DT12 is a maximum effective radius of an image-side surface of the first lens and DT62 is a maximum effective radius of an image-side surface of the sixth lens. More specifically, DT12 and DT62 may satisfy 0.55<DT12/DT62<0.8. Controlling the ratio of the maximum effective radius of the image-side surface of the first lens to the maximum effective radius of the image-side surface of the sixth lens may make the relative brightness at the edge of the effective pixel area on the imaging plane higher, which is beneficial to shorten the optical length of the optical imaging system and reduce the aperture of the optical imaging system, thereby miniaturizing the optical imaging system.

In an exemplary embodiment, the optical imaging system of the present disclosure may satisfy the conditional f/ImgH>0.6, where f is an effective focal length of the optical imaging system and ImgH is half of a diagonal length of the effective pixel region on the imaging plane of the optical imaging system. More specifically, f and ImgH may satisfy 0.63<f/ImgH<1. By controlling the ratio of the effective focal length of the optical imaging system to the image height, the total optical length of the optical imaging system can be shortened, so that the optical imaging system has a relative small size.

In an exemplary embodiment, the optical imaging system of the present disclosure may satisfy the conditional 0.2<SAG41/SAG52<0.7, where SAG41 is an on-axis distance from an intersection of an object-side surface of the fourth lens and the optical axis to a vertex of an effective radius of the object-side surface of the fourth lens, and SAG52 is an on-axis distance from an intersection of the image-side surface of the fifth lens and the optical axis to a vertex of an effective radius of the image-side surface of the fifth lens. More specifically, SAG41 and SAG52 may satisfy 0.32<SAG41/SAG52<0.57. By controlling the vector height of the object-side surface of the fourth lens and the vector height of the image-side surface of the fifth lens to satisfy 0.2<SAG41/SAG52<0.7, the astigmatic aberration of the optical imaging system is advantageously corrected, and the image quality in different directions may be uniform.

In an exemplary embodiment, the optical imaging system of the present disclosure may satisfy the conditional 0.5<SAG12/ET1<1, where SAG12 is an on-axis distance from an intersection of an image-side surface of the first lens and the optical axis to a vertex of an effective radius of the image-side surface of the first lens, and ET1 is an edge thickness of the first lens. More specifically, SAG12 and ET1 may satisfy 0.70<SAG12/ET1<0.95. By controlling the ratio of the vector height of the image-side surface of the first lens to the edge thickness of the first lens, the first lens may have a better machinability, and the coma aberration of the optical imaging system is also advantageously corrected, so that the optical imaging system has good imaging quality.

In an exemplary embodiment, the optical imaging system of the present disclosure may satisfy the conditional 0.2<ET3/ET2<0.7, where ET2 is an edge thickness of the second lens, and ET3 is an edge thickness of the third lens. More specifically, ET2 and ET3 may satisfy 0.27<ET3/ET2<0.58. By controlling the ratio of the edge thickness of the second lens to the edge thickness of the third lens, the assembly and processing of the optical imaging system are facilitated, and the optical imaging system has better structural stability. Optionally, a stop is provided between the second lens and the third lens.

In an exemplary embodiment, the optical imaging system of the present disclosure may satisfy the conditional−1<f/f1<−0.5, where f is an effective focal length of the optical imaging system and f1 is an effective focal length of the first lens. More specifically, f and f1 may satisfy−0.73<f/f1<−0.60. By controlling the refractive power of the first lens, the spherical aberration of the optical imaging system can be better corrected, so that the optical imaging system has better imaging quality.

In an exemplary embodiment, the optical imaging system of the present disclosure may satisfy the conditional 0.5<f/f3−f/f2<1, where f is an effective focal length of the optical imaging system, f2 is an effective focal length of the second lens, and f3 is an effective focal length of the third lens. More specifically, f, f2, and f3 may satisfy 0.52 f/f3−f/f2<0.92. By controlling the effective focal length of the second lens and the effective focal length of the third lens, the coma aberration of the optical imaging system can be corrected. In addition, the imaging quality at the off-axis field of view can be improved when Semi-FOV>60 xis In an exemplary embodiment, the optical imaging system of the present disclosure may satisfy the conditional 0.5<f/f2345<1.5, where f is an effective focal length of the optical imaging system and f2345 is a combined focal length of the second lens, the third lens, the fourth lens, and the fifth lens. More specifically, f and f2345 may satisfy 0.85<f/f2345<1.15. Controlling the ratio of the combined focal length of the first lens to the sixth lens to the combined focal length of the second lens to the fifth lens makes each lens cooperate to correct the spherical aberration of the optical imaging system and make each lens share the correction of the spherical aberration, thereby improving the image quality of the optical imaging system.

In an exemplary embodiment, the optical imaging system of the present disclosure may satisfy the conditional $-1<f5/f4<-0.5$, where f4 is an effective focal length of the fourth lens and f5 is an effective focal length of the fifth lens. More specifically, f4 and f5 may satisfy $-0.92<f5/f4<-0.57$. Controlling the ratio of the effective focal length of the fifth lens to the effective focal length of the fourth lens is advantageous for correcting the magnification chromatic aberration and the axial chromatic aberration of the optical imaging system, thereby making the optical imaging system has good imaging performance.

In an exemplary embodiment, the optical imaging system of the present disclosure may satisfy the conditional $0.2<f/(R3-R2)<1.2$, where f is an effective focal length of the optical imaging system, R2 is a radius of curvature of an image-side surface of the first lens, and R3 is a radius of curvature of an object-side surface of the second lens. More specifically, f, R2, and R3 may satisfy $0.40<f/(R3-R2)<0.95$. The image-side surface of the first lens and the object-side surface of the second lens face each other. Controlling the ratio of the effective focal length of the optical imaging system to the difference between the radii of curvature of the image-side surface of the first lens and the object-side surface of the second lens is beneficial for reducing and eliminating stray light generated by the first lens, thereby improving the imaging quality of the optical imaging system.

In an exemplary embodiment, the optical imaging system of the present disclosure may satisfy the conditional $0.2<R5/(R5-R6)<0.7$, where R5 is a radius of curvature of an object-side surface of the third lens and R6 is a radius of curvature of an image-side surface of the third lens. More specifically, R5 and R6 may satisfy $0.21<R5/(R5-R6)<0.62$. Controlling the radii of curvature of the object-side surface and the image-side surface of the third lens is beneficial for correcting the spherical aberration of the optical imaging system.

In an exemplary embodiment, the optical imaging system of the present disclosure may satisfy the conditional $0.5<R7/(R7+R10)<1$, where R7 is a radius of curvature of an object-side surface of the fourth lens and R10 is a radius of curvature of an image-side surface of the fifth lens. More specifically, R7 and R10 may satisfy $0.52<R7/(R7+R10)<0.93$. Controlling the radius of curvature of the object-side surface of the fourth lens and the radius of curvature of the image-side surface of the fifth lens to satisfy $0.5<R7/(R7+R10)<1$ is beneficial for correcting the field curvature aberration at the off-axis field of view of the optical imaging system, so that the edge field of view has high imaging quality, thereby improving the imaging performance of the optical imaging system.

In an exemplary embodiment, the optical imaging system of the present disclosure may satisfy the conditional $0.2<R12/f<1.2$, where f is an effective focal length of the optical imaging system and R12 is a radius of curvature of an image-side surface of the sixth lens. More specifically, f and R12 may satisfy $0.4<R12/f<1.0$. Controlling the ratio of the radius of curvature of the image-side surface of the sixth lens to the effective focal length of the optical imaging system is beneficial for shortening the back focus of the optical imaging system, thereby shortening the total optical length of the optical imaging system, and miniaturizing the optical imaging system.

In an exemplary embodiment, the optical imaging system of the present disclosure may satisfy the conditional $0.3<CT1/CT2<0.8$, where CT1 is a center thickness of the first lens along the optical axis, and CT2 is a center thickness of the second lens along the optical axis. More specifically, CT1 and CT2 may satisfy $0.4<CT1/CT2<0.8$. Controlling the ratio of the center thickness of the first lens to the center thickness of the second lens is advantageous to correct the field curvature aberration at the off-axis field of view of the optical imaging system and improve the imaging quality of the edge field of view, thereby improving the imaging performance of the optical imaging system.

In an exemplary embodiment, the optical imaging system of the present disclosure may satisfy the conditional $0.3<(CT3+CT4)/\Sigma AT<0.8$, where CT3 is a center thickness of the third lens along the optical axis, CT4 is a center thickness of the fourth lens along the optical axis, and e fourta sum of the spaced intervals between each two adjacent lenses among the first lens to the sixth lens along the optical axis. More specifically, CT3, CT4, and tem of the to the $c<(CT3+CT4)/axi<0.73$. By controlling the ratio of the sum of the center thickness of the third lens and the center thickness of the fourth lens to the sum of the spaced intervals between the first lens and the sixth lens, the chromatic aberration of the optical imaging system can be corrected, and the assembling of the lenses is facilitated, so that the optical imaging system has better processability.

In an exemplary embodiment, the optical imaging system of the present disclosure may satisfy the conditional $0.2<T56/(CT5+CT6)<0.7$, where CT5 is a center thickness of the fifth lens along the optical axis, CT6 is a center thickness of the sixth lens along the optical axis, and T56 is a spaced interval between the fifth lens and the sixth lens along the optical axis. More specifically, CT5, CT6, and T56 may satisfy $0.33<T56/(CT5+CT6)<0.58$. The ratio of the distance between the fifth lens and the sixth lens to the sum of the center thickness of the two lenses is controlled to satisfy $0.2<T56/(CT5+CT6)<0.7$. On the one hand, the ratio is not excessively large, thereby facilitating the miniaturization of the optical imaging system. On the other hand, the ratio is not too small, so that the optical imaging system has better assembly. In addition, by controlling the ratio, the off-axis aberrations of the optical imaging system is advantageously corrected and the intensity of the ghost image is reduced, and thus the optical imaging system has better manufacturability and higher imaging quality.

In an exemplary embodiment, the above-described optical imaging system may further include at least one stop. The stop may be provided at an appropriate position as desired, for example, between the second lens and the third lens. Optionally, the above-described optical imaging system may further include a filter for correcting color deviations and/or a protective glass for protecting the photosensitive element located on the imaging plane.

The optical imaging system according to the above embodiments of the present disclosure may employ a plurality of lenses, such as the six lenses as described above. By rationally distributing the refractive power of each lens, the surface shape, the center thickness of each lens, the on-axis spacing between the lenses, and the like, the size and the sensitivity of the imaging system can be effectively reduced, and the processability of the imaging system can be improved, such that the optical imaging system is more advantageous for production processing and may be applied to portable electronic products. At the same time, the optical imaging system of the present disclosure further has excellent optical performance such as large viewing angle and high resolution.

In an embodiment of the present disclosure, at least one of the surfaces of each lens is aspheric, that is, at least one of object-side surface and image-side surface of each of the first lens, the second lens, the third lens, the fourth lens, the fifth lens, and the sixth lens is aspheric. The aspheric lens is characterized by a continuous change in curvature from the center of the lens to the periphery of the lens. Unlike spherical lenses having a constant curvature from the center of the lens to the periphery of the lens, aspheric lenses have better radius of curvature characteristics, and have the advantages of improving distortion aberration and improving astigmatic aberration. With the aspheric lens, aberrations that occur at the time of imaging can be eliminated as much as possible, thereby improving the imaging quality. Optionally, both of the object-side surface and the image-side surface of each of the first lens, the second lens, the third lens, the fourth lens, the fifth lens, and the sixth lens are aspheric.

However, it will be appreciated by those skilled in the art that the number of lenses constituting the optical imaging system may be varied to obtain the various results and advantages described in this specification without departing from the claimed technical solution of the present disclosure. For example, although six lenses have been described in the embodiment, the optical imaging system is not limited to including six lenses. If desired, the optical imaging system may also include other numbers of lenses.

Some specific examples of an optical imaging system applicable to the above-described embodiments are further described below with reference to the accompanying drawings.

Example 1

An optical imaging system according to Example 1 of the present disclosure is described below with reference to FIGS. 1 to 2D. FIG. 1 shows a schematic structural diagram of an optical imaging system according to Example 1 of the present disclosure.

As shown in FIG. 1, the optical imaging system sequentially includes a first lens E1, a second lens E2, a stop STO, a third lens E3, a fourth lens E4, a fifth lens E5, a sixth lens E6, and an optical filter E7 from an object side to an image side along an optical axis.

The first lens E1 has a negative refractive power, an object-side surface S1 thereof is convex and an image-side surface S2 thereof is concave. The second lens E2 has a positive refractive power, an object-side surface S3 thereof is convex and an image-side surface S4 thereof is concave. The third lens E3 has a positive refractive power, an object-side surface S5 thereof is convex and an image-side surface S6 thereof is convex. The fourth lens E4 has a negative refractive power, an object-side surface S7 thereof is concave and an image-side surface S8 thereof is concave. The fifth lens E5 has a positive refractive power, an object-side surface S9 thereof is concave and an image-side surface S10 thereof is convex. The sixth lens E6 has a negative refractive power, an object-side surface S11 thereof is convex and an image-side surface S12 thereof is concave. The filter E7 has an object-side surface S13 and an image-side surface S14. The optical imaging system provided in the present examples has an imaging plane S15. Light from an object sequentially passes through each of the surfaces S1 to S14 and is finally imaged on the imaging plane S15.

Table 1 shows a table of basic parameters of the optical imaging system in Example 1, wherein the radius of curvature, the thickness/distance and the focal length are all in units of millimeters (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 29.7465 | 0.7407 | 1.54 | 55.9 | −3.39 | 44.5047 |
| S2 | Aspheric | 1.7013 | 1.2105 | | | | −0.4597 |
| S3 | Aspheric | 5.8382 | 1.4500 | 1.65 | 23.5 | 27.24 | 7.2852 |
| S4 | Aspheric | 7.8946 | 0.1787 | | | | −80.0000 |
| STO | Spherical | Infinite | −0.0686 | | | | |
| S5 | Aspheric | 1.7204 | 0.7486 | 1.55 | 56.1 | 2.18 | −1.8303 |
| S6 | Aspheric | −3.2586 | 0.2234 | | | | −3.7120 |
| S7 | Aspheric | −8.2824 | 0.4100 | 1.67 | 20.3 | −5.08 | −60.8933 |
| S8 | Aspheric | 5.8339 | 0.0872 | | | | −21.8775 |
| S9 | Aspheric | −85.6500 | 0.8745 | 1.55 | 56.1 | 3.49 | −38.0669 |
| S10 | Aspheric | −1.8722 | 0.5937 | | | | −2.5617 |
| S11 | Aspheric | 1.7621 | 0.5028 | 1.54 | 55.9 | −6.26 | −11.7617 |
| S12 | Aspheric | 1.0410 | 0.6065 | | | | −2.7520 |
| S13 | Spherical | Infinite | 0.2100 | 1.52 | 64.2 | | |
| S14 | Spherical | Infinite | 0.4000 | | | | |
| S15 | Spherical | Infinite | | | | | |

In Example 1, the value of the effective focal length f of the optical imaging system is 2.11 mm, the ratio of the effective focal length f to the entrance pupil diameter EPD is 2.43, the value of the distance TTL along the optical axis from the object-side surface of the first lens to the imaging plane is 8.17 mm, the value of half of a diagonal length ImgH of the effective pixel area on the imaging plane is 3.03 mm, and the value of half of a maximum field-of-view Semi-FOV is 65.0V e In Example 1, the object-side surface and the image-side surface of any one of the first lenses E1 to the sixth lens E6 are aspheric, and the surface type x of each aspheric lens may be defined by, but is not limited to, the following aspheric formula:

$$x = \frac{ch^2}{1 + \sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows the high-order term coefficients A4, A6, A8, A10, A12, A14 and A16 that can be applicable to each aspheric surface S1-S12 in Example 1.

TABLE 2

| Surface number | A4 | A6 | A8 | A10 | A12 | A14 | A16 |
|---|---|---|---|---|---|---|---|
| S1 | 3.5048E−02 | −1.2905E−02 | 3.1839E−03 | −5.2002E−04 | 5.2429E−05 | −2.9434E−06 | 7.0115E−08 |
| S2 | 6.2777E−02 | −7.8676E−04 | −9.2155E−03 | 3.0238E−03 | 3.0308E−03 | −1.5554E−03 | 1.2463E−04 |
| S3 | −2.3075E−02 | −3.9186E−03 | −1.7340E−03 | 8.5768E−03 | −9.8400E−03 | 4.6221E−03 | −7.7201E−04 |
| S4 | −1.0782E−01 | 1.0276E−01 | 8.6634E−01 | −4.4512E+00 | 1.0378E+01 | −1.1785E+01 | 5.3677E+00 |
| S5 | −1.1895E−01 | 2.6638E−01 | −3.4848E−01 | 3.9127E−01 | −3.5368E−01 | 4.6942E−01 | −2.6054E−01 |
| S6 | −2.1563E−01 | 3.9258E−02 | 4.0955E−01 | −1.5044E+00 | 3.1349E+00 | −3.3362E+00 | 1.5106E+00 |
| S7 | −4.0040E−01 | 1.5796E−01 | −2.8202E−01 | 1.5964E+00 | −2.7109E+00 | 1.9395E+00 | −4.9026E−01 |
| S8 | −1.0579E−01 | −5.1426E−03 | −3.3778E−02 | 4.0150E−01 | −5.3514E−01 | 2.8060E−01 | −5.3906E−02 |
| S9 | 7.4032E−02 | −1.2589E−01 | −2.2274E−02 | 2.2653E−01 | −2.2263E−01 | 8.9768E−02 | −1.3424E−02 |
| S10 | −8.0648E−02 | 1.0508E−01 | −1.0734E−01 | 8.2725E−02 | −5.0856E−02 | 2.0022E−02 | −3.0854E−03 |
| S11 | −9.5449E−02 | −1.1580E−01 | 1.5747E−01 | −9.9573E−02 | 3.4409E−02 | −6.0191E−03 | 4.1645E−04 |
| S12 | −1.4087E−01 | 6.9392E−02 | −2.3850E−02 | 5.3953E−03 | −7.8140E−04 | 6.5227E−05 | −2.3868E−06 |

Figures 2A, 2B:
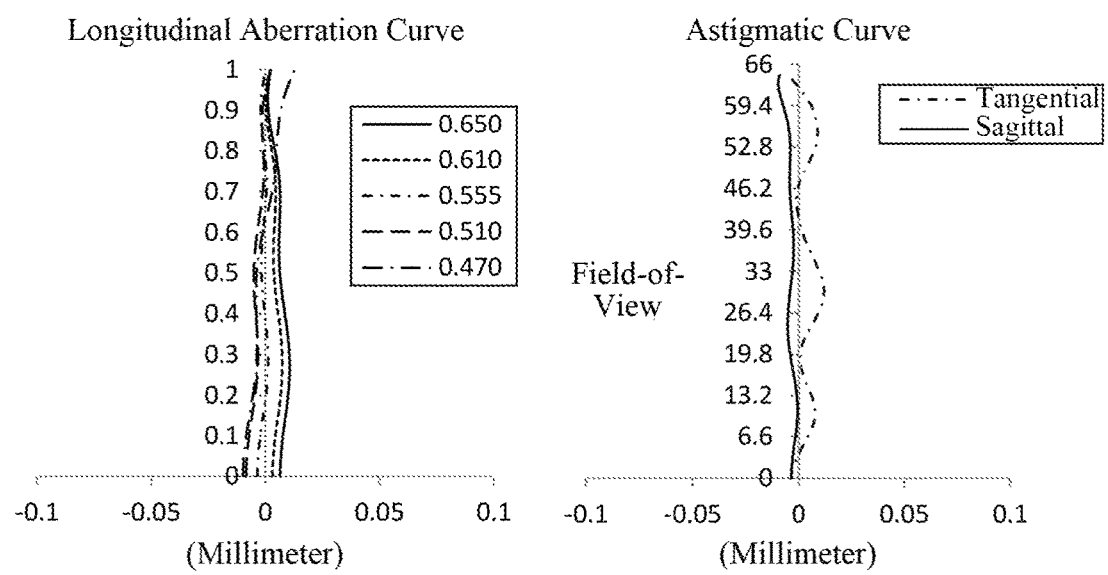
FIGS. 2A to 2D show a longitudinal aberration curve, an astigmatic curve, a distortion curve and a lateral color curve, respectively, of the optical imaging system of Example 1.
Figure 2C:
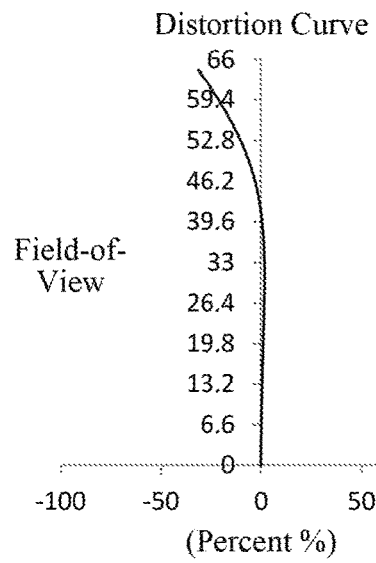
Figure 2D:
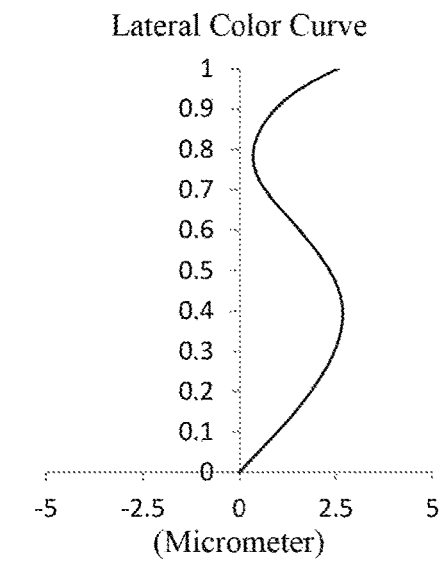

FIG. 2A shows a longitudinal aberration curve of the optical imaging system of Example 1, which represents the focus deviation of light with different wavelengths after passing through the system. FIG. 2B shows an astigmatic curve of the optical imaging system of Example 1, which represents a curvature of a tangential plane and a curvature of a sagittal plane. FIG. 2C shows a distortion curve of the optical imaging system of Example 1, which represents magnitude of distortion corresponding to different field-of-views. FIG. 2D shows a lateral color curve of the optical imaging system of Example 1, which represents deviations of different image heights on the imaging plane after light passes through the system. As can be seen from FIGS. 2A to 2D, the optical imaging system according to Example 1 can achieve good imaging quality.

Example 2

Figure 3:
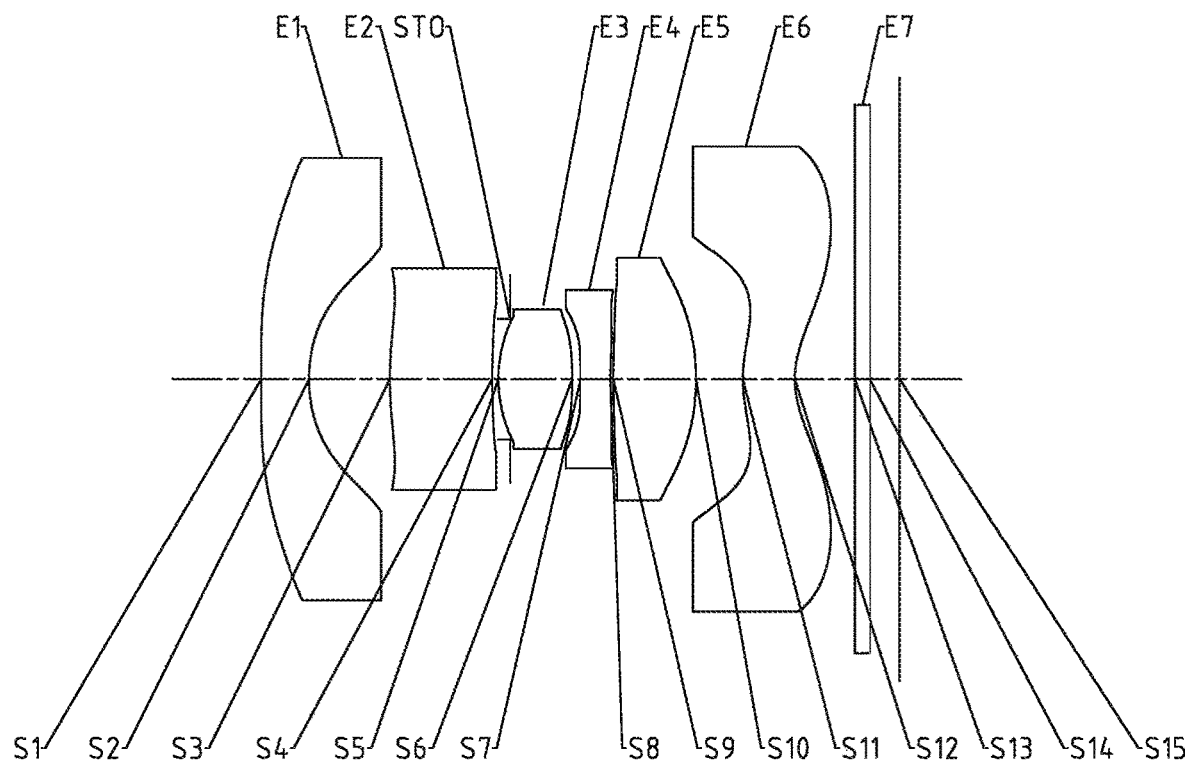
FIG. 3 shows a schematic structural diagram of an optical imaging system according to Example 2 of the present disclosure.

An optical imaging system according to Example 2 of the present disclosure is described below with reference to FIGS. 3 to 4D. In the present example and the following examples, the description similar to Example 1 will be omitted for brevity. FIG. 3 shows a schematic structural diagram of an optical imaging system according to Example 2 of the present disclosure.

As shown in FIG. 3, the optical imaging system sequentially includes a first lens E1, a second lens E2, a stop STO, a third lens E3, a fourth lens E4, a fifth lens E5, a sixth lens E6, and an optical filter E7 from an object side to an image side along an optical axis.

The first lens E1 has a negative refractive power, an object-side surface S1 thereof is concave and an image-side surface S2 thereof is concave. The second lens E2 has a positive refractive power, an object-side surface S3 thereof is convex and an image-side surface S4 thereof is concave. The third lens E3 has a positive refractive power, an object-side surface S5 thereof is convex and an image-side surface S6 thereof is convex. The fourth lens E4 has a negative refractive power, an object-side surface S7 thereof is concave and an image-side surface S8 thereof is concave. The fifth lens E5 has a positive refractive power, an object-side surface S9 thereof is convex and an image-side surface S10 thereof is convex. The sixth lens E6 has a negative refractive power, an object-side surface S11 thereof is convex and an image-side surface S12 thereof is concave. The filter E7 has an object-side surface S13 and an image-side surface S14. The optical imaging system provided in the present examples has an imaging plane S15. Light from an object sequentially passes through each of the surfaces S1 to S14 and is finally imaged on the imaging plane S15.

In Example 2, the value of the effective focal length f of the optical imaging system is 2.65 mm, the ratio of the effective focal length f to the entrance pupil diameter EPD is 2.43, the value of the distance TTL along the optical axis from the object-side surface of the first lens to the imaging plane is 8.60 mm, the value of half of a diagonal length ImgH of the effective pixel area on the imaging plane is 4.09 mm, and the value of half of a maximum field-of-view Semi-FOV is 65.0 ngl Table 3 shows a table of basic parameters of the optical imaging system of Example 2, wherein the radius of curvature, the thickness and the focal length are all in units of millimeters (mm). Table 4 shows the high-order term coefficients that can be applicable to each aspheric surface in Example 2, wherein each aspheric shape can be defined by Equation (1) given in Example 1 above.

TABLE 3

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| S1 | Aspheric | −92.5717 | 0.6500 | 1.54 | 55.9 | −3.87 | 44.5047 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S2 | Aspheric | 2.1280 | 1.0873 | | | | −1.0974 |
| S3 | Aspheric | 5.3572 | 1.3743 | 1.65 | 23.5 | 27.59 | 0.9389 |
| S4 | Aspheric | 6.8961 | 0.2393 | | | | −80.0000 |
| STO | Spherical | Infinite | −0.1558 | | | | |
| S5 | Aspheric | 1.8106 | 0.9907 | 1.55 | 56.1 | 2.66 | −0.9063 |
| S6 | Aspheric | −5.8997 | 0.1124 | | | | −10.1837 |
| S7 | Aspheric | −27.2217 | 0.4100 | 1.67 | 20.3 | −8.44 | −60.8933 |
| S8 | Aspheric | 7.1353 | 0.0380 | | | | −21.8775 |
| S9 | Aspheric | 13.5590 | 1.1092 | 1.55 | 56.1 | 5.01 | −38.0669 |
| S10 | Aspheric | −3.3270 | 0.6301 | | | | −0.0189 |
| S11 | Aspheric | 1.9565 | 0.6982 | 1.54 | 55.9 | −10.74 | −9.9569 |
| S12 | Aspheric | 1.2786 | 0.8063 | | | | −1.9182 |
| S13 | Spherical | Infinite | 0.2100 | 1.52 | 64.2 | | |
| S14 | Spherical | Infinite | 0.4000 | | | | |
| S15 | Spherical | Infinite | | | | | |

TABLE 4

| Surface number | A4 | A6 | A8 | A10 | A12 | A14 | A16 |
|---|---|---|---|---|---|---|---|
| S1 | 3.6098E−02 | −1.1235E−02 | 2.4402E−03 | −3.6916E−04 | 3.6658E−05 | −2.1052E−06 | 5.2314E−08 |
| S2 | 5.8864E−02 | −1.4631E−03 | −5.0635E−03 | −7.1470E−04 | 2.2343E−03 | −1.0048E−03 | 1.3568E−04 |
| S3 | −2.5652E−02 | −2.0035E−03 | −9.6416E−03 | 9.3691E−03 | −5.9584E−03 | 2.2326E−03 | −3.1746E−04 |
| S4 | −6.7475E−02 | 9.6039E−02 | −5.2304E−02 | −1.6090E−01 | 5.0011E−01 | −5.1529E−01 | 1.9867E−01 |
| S5 | −7.2246E−02 | 2.4821E−01 | −6.5138E−01 | 1.5321E+00 | −2.2799E+00 | 1.9044E+00 | −6.6035E−01 |
| S6 | −1.5088E−01 | −2.3377E−01 | 1.1682E+00 | −2.8058E+00 | 4.0951E+00 | −3.2218E+00 | 1.0865E+00 |
| S7 | −2.4968E−01 | −2.4204E−01 | 8.4211E−01 | −1.4899E+00 | 1.9362E+00 | −1.4846E+00 | 4.9406E−01 |
| S8 | 2.5858E−04 | −4.6811E−01 | 9.5813E−01 | −8.9177E−01 | 4.5601E−01 | −1.2089E−01 | 1.2480E−02 |
| S9 | 9.8438E−02 | −5.0444E−01 | 9.2559E−01 | −8.8914E−01 | 4.8141E−01 | −1.3913E−01 | 1.6725E−02 |
| S10 | −5.5370E−02 | 6.5028E−02 | −5.8470E−02 | 3.9358E−02 | −1.7526E−02 | 4.4183E−03 | −4.5767E−04 |
| S11 | −5.3005E−02 | −5.7458E−02 | 3.4518E−02 | −9.2845E−03 | 6.2770E−05 | 4.8227E−04 | −6.4029E−05 |
| S12 | −1.0422E−01 | 3.3667E−02 | −7.3646E−03 | 1.0629E−03 | −9.7257E−05 | 5.0883E−06 | −1.1660E−07 |

Figure 4A:
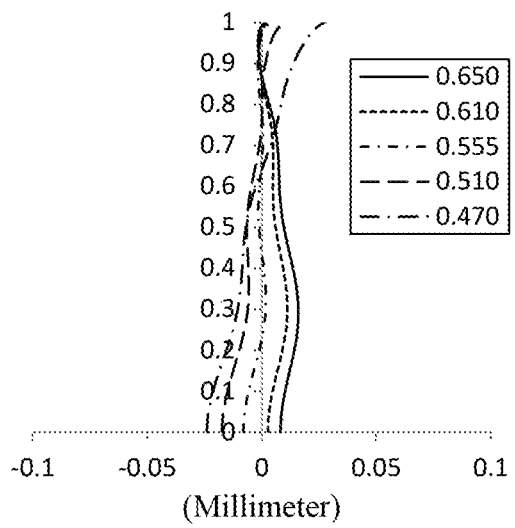
FIGS. 4A to 4D show a longitudinal aberration curve, an astigmatic curve, a distortion curve and a lateral color curve, respectively, of the optical imaging system of Example 2.
Figure 4B:
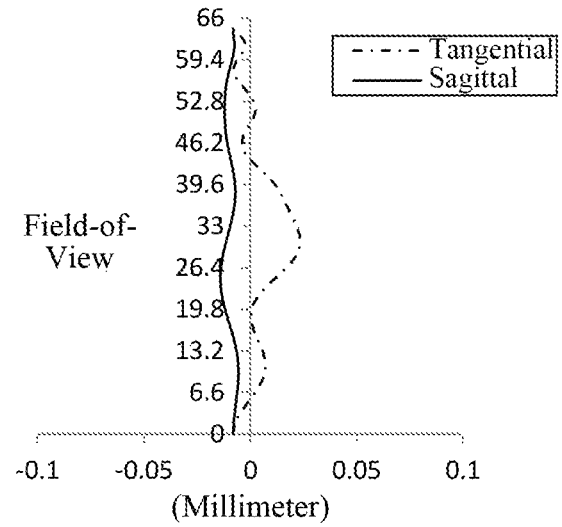
Figure 4C:
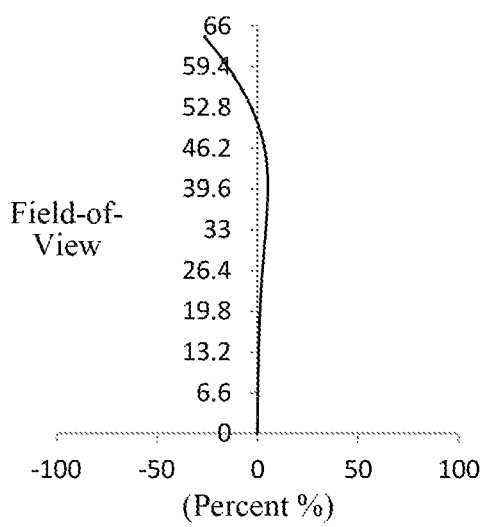
Figure 4D:
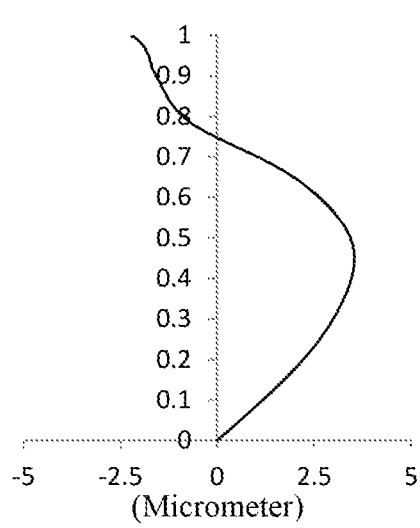

FIG. 4A shows a longitudinal aberration curve of the optical imaging system of Example 2, which represents the focus deviation of light with different wavelengths after passing through the system. FIG. 4B shows an astigmatic curve of the optical imaging system of Example 2, which represents a curvature of a tangential plane and a curvature of a sagittal plane. FIG. 4C shows a distortion curve of the optical imaging system of Example 2, which represents magnitude of distortion corresponding to different field-of-views. FIG. 4D shows a lateral color curve of the optical imaging system of Example 2, which represents deviations of different image height on the imaging plane after light passes through the system. As can be seen from FIGS. 4A to 4D, the optical imaging system according to Example 2 can achieve good imaging quality.

Example 3

An optical imaging system according to Example 3 of the present disclosure is described below with reference to FIGS. 5 to 6D. FIG. 5 shows a schematic structural diagram of an optical imaging system according to Example 3 of the present disclosure.

As shown in FIG. 5, the optical imaging system sequentially includes a first lens E1, a second lens E2, a stop STO, a third lens E3, a fourth lens E4, a fifth lens E5, a sixth lens E6, and an optical filter E7 from an object side to an image side along an optical axis.

The first lens E1 has a negative refractive power, an object-side surface S1 thereof is concave and an image-side surface S2 thereof is concave. The second lens E2 has a positive refractive power, an object-side surface S3 thereof is convex and an image-side surface S4 thereof is convex. The third lens E3 has a positive refractive power, an object-side surface S5 thereof is convex and an image-side surface S6 thereof is convex. The fourth lens E4 has a negative refractive power, an object-side surface S7 thereof is concave and an image-side surface S8 thereof is concave. The fifth lens E5 has a positive refractive power, an object-side surface S9 thereof is convex and an image-side surface S10 thereof is convex. The sixth lens E6 has a negative refractive power, an object-side surface S11 thereof is convex and an image-side surface S12 thereof is concave. The filter E7 has an object-side surface S13 and an image-side surface S14. The optical imaging system provided in the present examples has an imaging plane S15. Light from an object sequentially passes through each of the surfaces S1 to S14 and is finally imaged on the imaging plane S15.

In Example 3, the value of the effective focal length f of the optical imaging system is 2.82 mm, the ratio of the effective focal length f to the entrance pupil diameter EPD is 2.53, the value of the distance TTL along the optical axis from the object-side surface of the first lens to the imaging plane is 8.60 mm, the value of half of a diagonal length ImgH of the effective pixel area on the imaging plane is 3.03 mm, and the value of half of a maximum field-of-view Semi-FOV is 65.0°.

Table 5 shows a table of basic parameters of the optical imaging system of Example 3, wherein the radius of curvature, the thickness and the focal length are all in units of millimeters (mm). Table 6 shows the high-order term coefficients that can be applicable to each aspheric surface in Example 3, wherein each aspheric shape can be defined by Equation (1) given in Example 1 above.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −24.7369 | 0.6500 | 1.54 | 55.9 | −3.99 | 44.5047 |
| S2 | Aspheric | 2.3664 | 1.0579 | | | | −0.9831 |
| S3 | Aspheric | 8.9194 | 1.3071 | 1.65 | 23.5 | 11.19 | −53.5899 |
| S4 | Aspheric | −35.4706 | 0.3357 | | | | −80.0000 |
| STO | Spherical | Infinite | −0.1075 | | | | |
| S5 | Aspheric | 2.1938 | 0.8525 | 1.55 | 56.1 | 3.07 | −0.5871 |
| S6 | Aspheric | −6.1662 | 0.1789 | | | | −22.3617 |
| S7 | Aspheric | −18.2251 | 0.4100 | 1.67 | 20.3 | −4.78 | −60.8933 |
| S8 | Aspheric | 3.8960 | 0.0510 | | | | −21.8775 |
| S9 | Aspheric | 4.1940 | 1.1313 | 1.55 | 56.1 | 3.50 | −38.0669 |
| S10 | Aspheric | −3.1687 | 0.9058 | | | | 0.3960 |
| S11 | Aspheric | 3.1238 | 0.5872 | 1.54 | 55.9 | −4.98 | −25.3712 |
| S12 | Aspheric | 1.3462 | 0.6301 | | | | −2.6968 |
| S13 | Spherical | Infinite | 0.2100 | 1.52 | 64.2 | | |
| S14 | Spherical | Infinite | 0.4000 | | | | |
| S15 | Spherical | Infinite | | | | | |

TABLE 6

| Surface number | A4 | A6 | A8 | A10 | A12 | A14 | A16 |
|---|---|---|---|---|---|---|---|
| S1 | 2.7028E−02 | −6.3171E−03 | 1.2887E−03 | −2.0923E−04 | 2.2748E−05 | −1.3927E−06 | 3.5940E−08 |
| S2 | 4.4855E−02 | −2.1489E−03 | 1.0154E−02 | −1.3807E−02 | 9.7349E−03 | −3.4894E−03 | 4.5183E−04 |
| S3 | −2.8257E−02 | −1.2789E−02 | 1.0141E−02 | −1.0258E−02 | 3.8319E−03 | 2.0943E−04 | −2.0485E−04 |
| S4 | −6.1988E−02 | 3.0921E−03 | 1.4888E−01 | −3.7361E−01 | 5.0683E−01 | −3.5253E−01 | 1.0259E−01 |
| S5 | −2.5100E−02 | 4.8202E−02 | −4.9794E−02 | 1.8544E−01 | −3.2739E−01 | 2.9504E−01 | −9.6979E−02 |
| S6 | −1.8568E−01 | 6.9733E−03 | 2.9752E−02 | −6.2949E−01 | 8.6803E−01 | −6.8477E−01 | 2.5122E−01 |
| S7 | −2.9173E−01 | −3.2332E−02 | 2.8483E−01 | −2.5299E−02 | −4.3775E−01 | 4.5520E−01 | −1.4160E−01 |
| S8 | −8.1832E−02 | −1.8566E−01 | 6.3197E−01 | −7.5369E−01 | 4.7624E−01 | −1.5743E−01 | 2.1360E−02 |
| S9 | 2.9123E−02 | −2.3822E−01 | 4.9138E−01 | −5.2831E−01 | 3.1484E−01 | −9.8496E−02 | 1.2741E−02 |
| S10 | −3.1771E−01 | 3.4783E−02 | −4.2394E−02 | 3.2705E−02 | −1.6137E−02 | 4.4186E−03 | −4.6170E−04 |
| S11 | −1.1314E−01 | −5.0513E−02 | 7.6884E−02 | −4.6459E−02 | 1.5063E−02 | −2.4284E−03 | 1.5286E−04 |
| S12 | −1.3597E−01 | 6.3418E−02 | −2.0913E−02 | 4.5225E−03 | −6.2768E−04 | 4.9612E−05 | −1.6677E−06 |

FIG. 6A shows a longitudinal aberration curve of the optical imaging system of Example 3, which represents the focus deviation of light with different wavelengths after passing through the system. FIG. 6B shows an astigmatic curve of the optical imaging system of Example 3, which represents a curvature of a tangential plane and a curvature of a sagittal plane. FIG. 6C shows a distortion curve of the optical imaging system of Example 3, which represents magnitude of distortion corresponding to different field-of-views. FIG. 6D shows a lateral color curve of the optical imaging system of Example 3, which represents deviations of different image height on the imaging plane after light passes through the system. As can be seen from FIGS. 6A to 6D, the optical imaging system according to Example 3 can achieve good imaging quality.

Example 4

An optical imaging system according to Example 4 of the present disclosure is described below with reference to FIGS. 7 to 8D. FIG. 7 shows a schematic structural diagram of an optical imaging system according to Example 4 of the present disclosure.

As shown in FIG. 7, the optical imaging system sequentially includes a first lens E1, a second lens E2, a stop STO, a third lens E3, a fourth lens E4, a fifth lens E5, a sixth lens E6, and an optical filter E7 from an object side to an image side along an optical axis.

The first lens E1 has a negative refractive power, an object-side surface S1 thereof is concave and an image-side surface S2 thereof is concave. The second lens E2 has a positive refractive power, an object-side surface S3 thereof is convex and image-side surface S4 thereof is concave. The third lens E3 has a positive refractive power, an object-side surface S5 thereof is convex and an image-side surface S6 thereof is convex. The fourth lens E4 has a negative refractive power, an object-side surface S7 thereof is concave and an image-side surface S8 thereof is convex. The fifth lens E5 has a positive refractive power, an object-side surface S9 thereof is convex and an image-side surface S10 thereof is convex. The sixth lens E6 has a negative refractive power, an object-side surface S11 thereof is convex and an image-side surface S12 thereof is concave. The filter E7 has an object-side surface S13 and an image-side surface S14. The optical imaging system provided in the present examples has an imaging plane S15. Light from an object sequentially passes through each of the surfaces S1 to S14 and is finally imaged on the imaging plane S15.

In Example 4, the value of the effective focal length f of the optical imaging system is 2.29 mm, the ratio of the effective focal length f to the entrance pupil diameter EPD is 2.43, the value of the distance TTL along the optical axis from the object-side surface of the first lens to the imaging plane is 8.50 mm, the value of half of a diagonal length ImgH of the effective pixel area on the imaging plane is 3.40 mm, and the value of half of a maximum field-of-view Semi-FOV is 65.0°.

Table 7 shows a table of basic parameters of the optical imaging system of Example 4, wherein the radius of curvature, the thickness and the focal length are all in units of millimeters (mm). Table 8 shows the high-order term coefficients that can be applicable to each aspheric surface in Example 4, wherein each aspheric shape can be defined by Equation (1) given in Example 1 above.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −23.2536 | 0.6673 | 1.54 | 55.9 | −3.29 | 48.4136 |
| S2 | Aspheric | 1.9314 | 1.1113 | | | | −0.9064 |
| S3 | Aspheric | 4.4042 | 1.5621 | 1.65 | 23.5 | 10.82 | 1.5701 |
| S4 | Aspheric | 10.2825 | 0.1936 | | | | 78.3389 |
| STO | Spherical | Infinite | −0.0927 | | | | |
| S5 | Aspheric | 2.0467 | 0.8786 | 1.55 | 56.1 | 2.48 | 1.6406 |
| S6 | Aspheric | −3.3915 | 0.1777 | | | | −22.4277 |
| S7 | Aspheric | −3.4929 | 0.3978 | 1.67 | 20.3 | −5.47 | −23.5058 |
| S8 | Aspheric | −87.9765 | 0.0380 | | | | −80.0000 |
| S9 | Aspheric | 21.4894 | 0.9356 | 1.55 | 56.1 | 4.91 | −80.0000 |
| S10 | Aspheric | −3.0188 | 0.7038 | | | | 1.5013 |
| S11 | Aspheric | 1.4886 | 0.5923 | 1.54 | 55.9 | −16.69 | −5.8927 |
| S12 | Aspheric | 1.0991 | 0.7247 | | | | −2.1212 |
| S13 | Spherical | Infinite | 0.2100 | 1.52 | 64.2 | | |
| S14 | Spherical | Infinite | 0.4000 | | | | |
| S15 | Spherical | Infinite | | | | | |

TABLE 8

| Surface number | A4 | A6 | A8 | A10 | A12 | A14 | A16 |
|---|---|---|---|---|---|---|---|
| S1 | 3.6648E−02 | −1.1420E−02 | 2.4459E−03 | −3.6015E−04 | 3.4882E−05 | −1.9916E−06 | 5.0634E−08 |
| S2 | 5.7560E−02 | −4.3207E−03 | 2.9357E−03 | −1.1083E−02 | 8.3687E−03 | −2.7774E−03 | 3.3477E−04 |
| S3 | −2.5488E−02 | 3.9815E−03 | −2.2218E−02 | 2.2837E−02 | −1.3766E−02 | 4.3390E−03 | −5.1695E−04 |
| S4 | −4.8753E−02 | 2.7327E−02 | 3.5053E−02 | −8.2758E−02 | 8.0830E−02 | 4.4334E−02 | −5.0192E−02 |
| S5 | −4.8903E−02 | 1.1787E−01 | −5.3847E−01 | 1.8671E+00 | −3.7221E+00 | 3.9164E+00 | −1.6643E+00 |
| S6 | −1.7489E−01 | −1.3541E−01 | 6.8500E−01 | −1.7048E+00 | 2.6892E+00 | −2.3072E+00 | 8.4095E−01 |
| S7 | −2.6910E−01 | −3.0374E−01 | 1.0561E+00 | −2.0244E+00 | 2.9032E+00 | −2.4448E+00 | 8.4417E−01 |
| S8 | 3.7238E−02 | −6.0207E−01 | 1.2622E+00 | −1.2869E+00 | 7.7502E−01 | −2.6672E−01 | 4.0630E−02 |
| S9 | 1.0823E−01 | −5.6014E−01 | 1.0285E+00 | −1.0275E+00 | 5.9355E−01 | −1.8701E−01 | 2.4996E−02 |
| S10 | −7.2099E−02 | 1.0239E−01 | −9.7260E−02 | 5.8491E−02 | −2.0926E−02 | 3.7068E−03 | −1.6582E−04 |
| S11 | −5.2145E−02 | −7.5267E−02 | 5.9600E−02 | −2.8112E−02 | 7.6559E−03 | −1.0233E−03 | 5.1371E−05 |
| S12 | −1.0884E−01 | 3.7677E−02 | −9.0734E−03 | 1.4607E−03 | −1.5076E−04 | 8.9319E−06 | −2.3499E−07 |

Figure 8A:
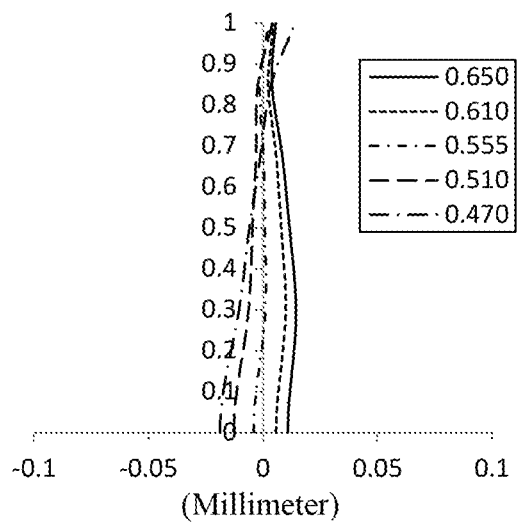
FIGS. 8A to 8D show a longitudinal aberration curve, an astigmatic curve, a distortion curve and a lateral color curve, respectively, of the optical imaging system of Example 4.
Figure 8B:
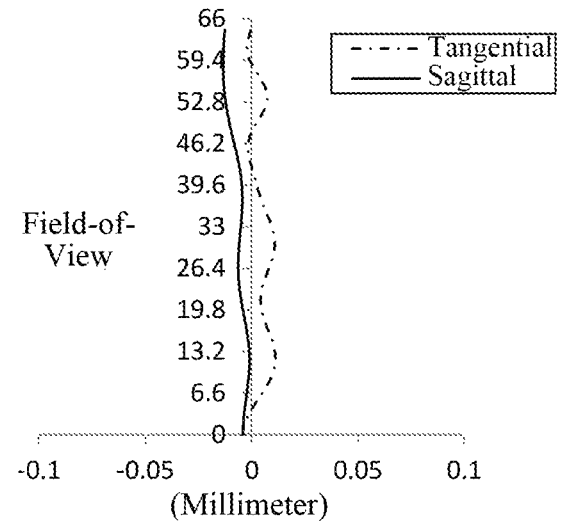
Figure 8C:
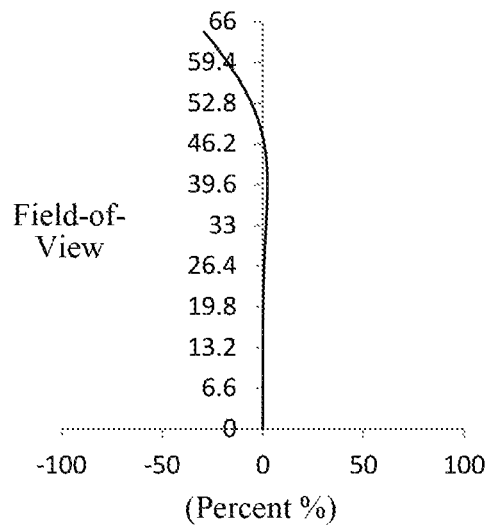
Figure 8D:
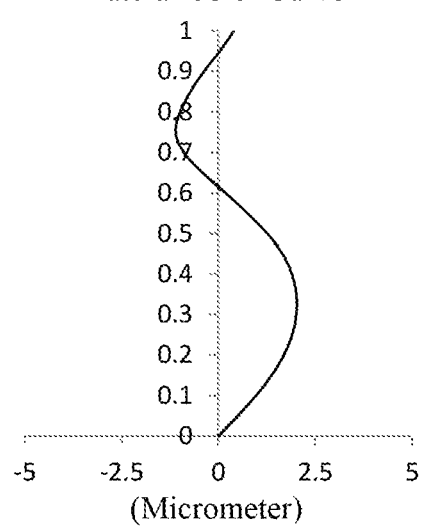

FIG. 8A shows a longitudinal aberration curve of the optical imaging system of Example 4, which represents the focus deviation of light with different wavelengths after passing through the system. FIG. 8B shows an astigmatic curve of the optical imaging system of Example 4, which represents a curvature of a tangential plane and a curvature of a sagittal plane. FIG. 8C shows a distortion curve of the optical imaging system of Example 4, which represents magnitude of distortion corresponding to different field-of-views. FIG. 8D shows a lateral color curve of the optical imaging system of Example 4, which represents deviations of different image height on the imaging plane after light passes through the system. As can be seen from FIGS. 8A to 8D, the optical imaging system according to Example 4 can achieve good imaging quality.

Example 5

Figure 9:
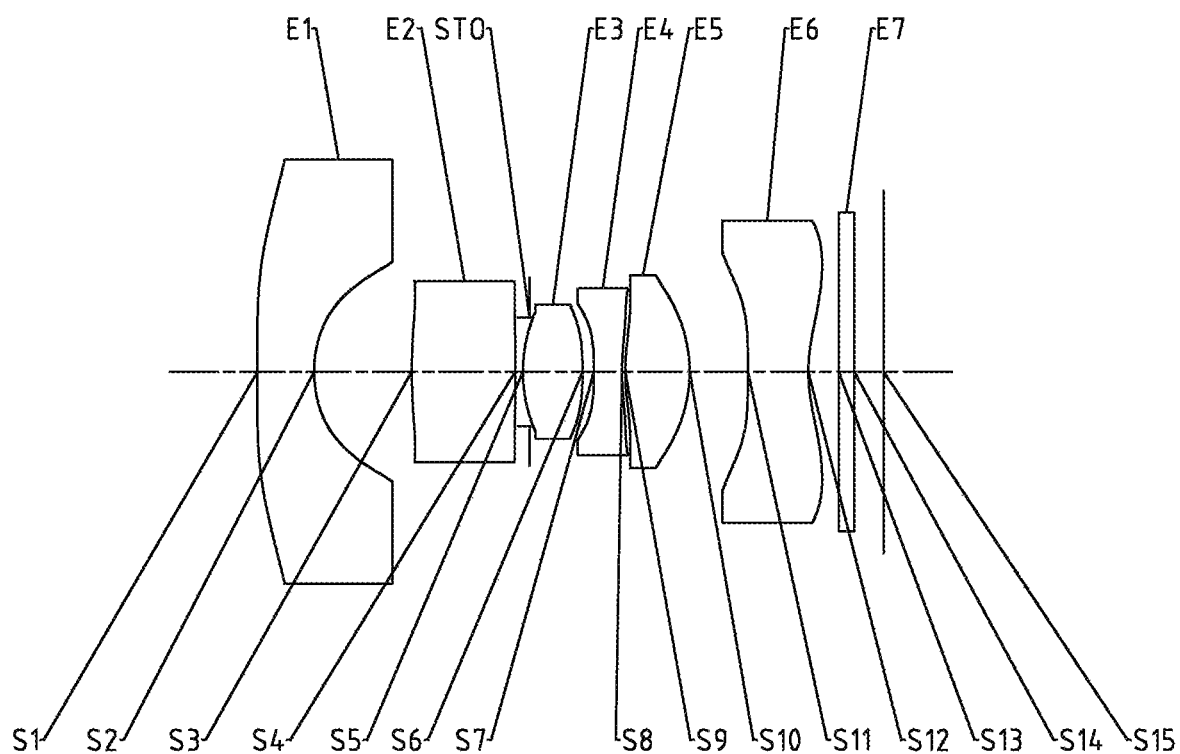
FIG. 9 is a schematic structural diagram of an optical imaging system according to Example 5 of the present disclosure.

An optical imaging system according to Example 5 of the present disclosure is described below with reference to FIGS. 9 to 10D. FIG. 9 shows a schematic structural diagram of an optical imaging system according to Example 5 of the present disclosure.

As shown in FIG. 9, the optical imaging system sequentially includes a first lens E1, a second lens E2, a stop STO, a third lens E3, a fourth lens E4, a fifth lens E5, a sixth lens E6, and an optical filter E7 from an object side to an image side along an optical axis.

The first lens E1 has a negative refractive power, an object-side surface S1 thereof is concave and an image-side surface S2 thereof is concave. The second lens E2 has a positive refractive power, an object-side surface S3 thereof is convex and an image-side surface S4 thereof is concave. The third lens E3 has a positive refractive power, an object-side surface S5 thereof is convex and an image-side surface S6 thereof is convex. The fourth lens E4 has a negative refractive power, an object-side surface S7 thereof is concave and an image-side surface S8 thereof is concave. The fifth lens E5 has a positive refractive power, an object-side surface S9 thereof is convex and an image-side surface S10 thereof is convex. The sixth lens E6 has a negative refractive power, an object-side surface S11 thereof is concave and an image-side surface S12 thereof is concave. The filter E7 has an object-side surface S13 and an image-side surface S14. The optical imaging system provided in the present examples has an imaging plane S15. Light from an object sequentially passes through each of the surfaces S1 to S14 and is finally imaged on the imaging plane S15.

In Example 5, the value of the effective focal length f of the optical imaging system is 2.11 mm, the ratio of the effective focal length f to the entrance pupil diameter EPD is 2.48, the value of the distance TTL along the optical axis from the object-side surface of the first lens to the imaging plane is 8.50 mm, the value of half of a diagonal length ImgH of the effective pixel region on the imaging plane is 2.40 mm, and the value of half of a maximum field-of-view Semi-FOV is 65.0°.

Table 9 shows a table of basic parameters of the optical imaging system of Example 5, wherein the radius of curvature, the thickness and the focal length are all in units of millimeters (mm). Table 10 shows the high-order term coefficients that can be applicable to each aspheric surface in Example 5, wherein each aspheric shape can be defined by Equation (1) given in Example 1 above.

of a sagittal plane. FIG. 10C shows a distortion curve of the optical imaging system of Example 5, which represents magnitude of distortion corresponding to different field-of-views. FIG. 10D shows a lateral color curve of the optical imaging system of Example 5, which represents deviations of different image height on the imaging plane after light passes through the system. As can be seen from FIGS. 10A to 10D, the optical imaging system according to Example 5 can achieve good imaging quality.

Example 6

Figure 11:
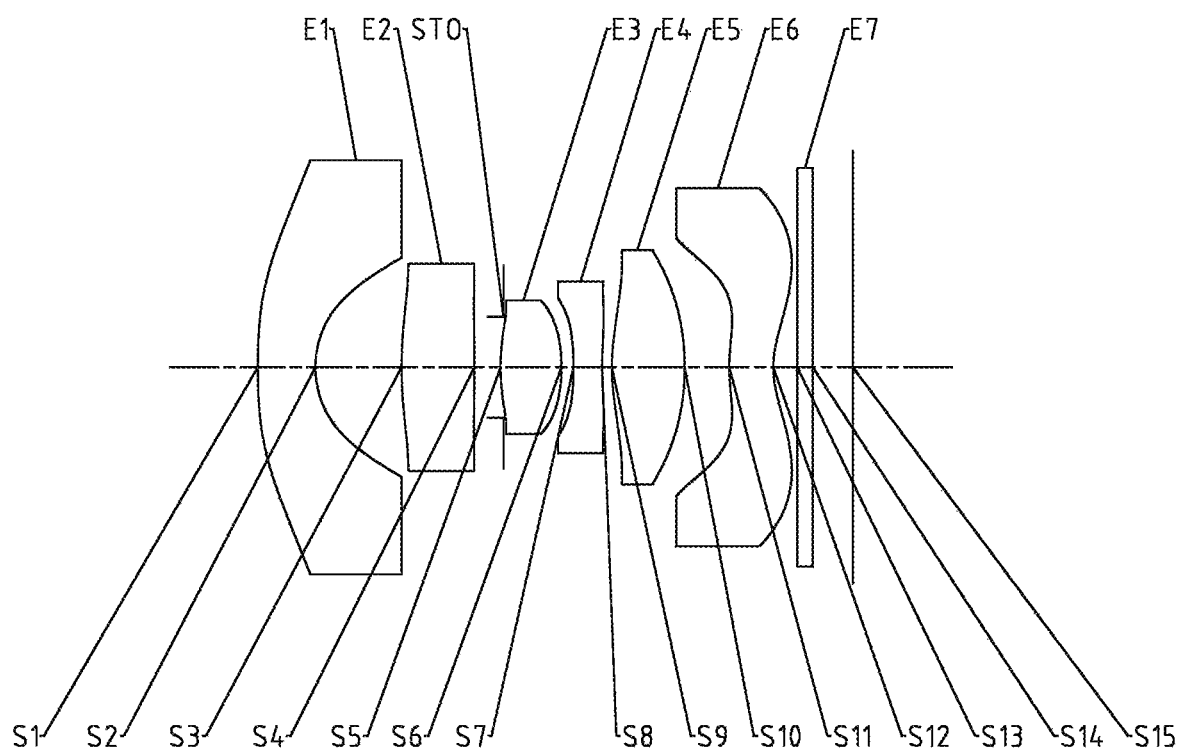
FIG. 11 shows a schematic structural diagram of an optical imaging system according to Example 6 of the present disclosure.

An optical imaging system according to Example 6 of the present disclosure is described below with reference to FIGS. 11 to 12D. FIG. 11 shows a schematic structural diagram of an optical imaging system according to Example 6 of the present disclosure.

As shown in FIG. 11, the optical imaging system sequentially includes a first lens E1, a second lens E2, a stop STO, a third lens E3, a fourth lens E4, a fifth lens E5, a sixth lens E6, and an optical filter E7 from an object side to an image side along an optical axis.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −29.8474 | 0.7678 | 1.54 | 55.9 | −2.95 | 46.1516 |
| S2 | Aspheric | 1.7204 | 1.3253 | | | | −0.2492 |
| S3 | Aspheric | 6.6514 | 1.4054 | 1.67 | 20.3 | 10.87 | 1.7564 |
| S4 | Aspheric | 74.4729 | 0.1951 | | | | 80.0000 |
| STO | Spherical | Infinite | −0.0906 | | | | |
| S5 | Aspheric | 1.9811 | 0.8113 | 1.55 | 56.1 | 2.65 | 1.3132 |
| S6 | Aspheric | −4.5570 | 0.1532 | | | | −19.7462 |
| S7 | Aspheric | −7.6840 | 0.3800 | 1.67 | 20.3 | −3.13 | −51.7327 |
| S8 | Aspheric | 2.9209 | 0.0453 | | | | −53.8462 |
| S9 | Aspheric | 2.8259 | 0.8741 | 1.55 | 56.1 | 2.27 | −37.2614 |
| S10 | Aspheric | −1.9644 | 0.7913 | | | | −0.2164 |
| S11 | Aspheric | −175.8274 | 0.8198 | 1.54 | 55.9 | −3.68 | 70.0000 |
| S12 | Aspheric | 2.0339 | 0.4118 | | | | −3.3264 |
| S13 | Spherical | Infinite | 0.2100 | 1.52 | 64.2 | | |
| S14 | Spherical | Infinite | 0.4000 | | | | |
| S15 | Spherical | Infinite | | | | | |

TABLE 10

| Surface number | A4 | A6 | A8 | A10 | A12 | A14 | A16 |
|---|---|---|---|---|---|---|---|
| S1 | 3.6110E−02 | −1.2315E−02 | 3.1387E−03 | −5.3966E−04 | 5.6862E−05 | −3.3147E−06 | 8.2021E−08 |
| S2 | 6.6864E−02 | −9.4516E−04 | 6.7756E−03 | −2.1705E−02 | 2.5517E−02 | −1.1314E−02 | 1.5572E−03 |
| S3 | −1.9975E−02 | −1.8568E−02 | 3.6218E−02 | −5.6964E−02 | 4.5910E−02 | −2.0065E−02 | 3.8054E−03 |
| S4 | −5.1531E−02 | −5.2052E−02 | 5.8662E−02 | −1.9086E+00 | 3.2361E+00 | −2.7359E+00 | 9.1980E−01 |
| S5 | −5.7759E−02 | 3.2832E−02 | 1.1044E−01 | −4.9721E−01 | 8.2796E−01 | −6.2393E−01 | 1.8739E−01 |
| S6 | −1.6889E−01 | −1.2533E−01 | 8.2553E−01 | −2.3324E+00 | 3.6433E+00 | −2.8512E+00 | 9.0537E−01 |
| S7 | −3.0909E−01 | −5.2315E−02 | 5.6031E−01 | −1.4056E+00 | 2.0667E+00 | −1.4874E+00 | 4.1403E−01 |
| S8 | 1.7988E−01 | −4.2907E−01 | 1.0901E+00 | −1.4867E+00 | 1.2120E+00 | −5.3139E−01 | 9.4683E−02 |
| S9 | 3.9639E−02 | −2.6837E−01 | 4.3378E−01 | −4.0367E−01 | 1.8756E−01 | −1.8014E−02 | −8.1989E−03 |
| S10 | 3.6712E−03 | −1.7500E−02 | 2.8532E−02 | −2.2740E−02 | −2.5228E−04 | 9.7286E−03 | −3.0324E−03 |
| S11 | −1.2147E−01 | 2.3649E−02 | 1.3654E−02 | −1.6070E−02 | 9.2500E−03 | −2.5543E−03 | 2.6323E−04 |
| S12 | −1.0960E−01 | 5.8028E−02 | −2.6274E−02 | 8.5179E−03 | −1.7989E−03 | 2.1325E−04 | −1.0735E−05 |

Figures 10A, 10B:
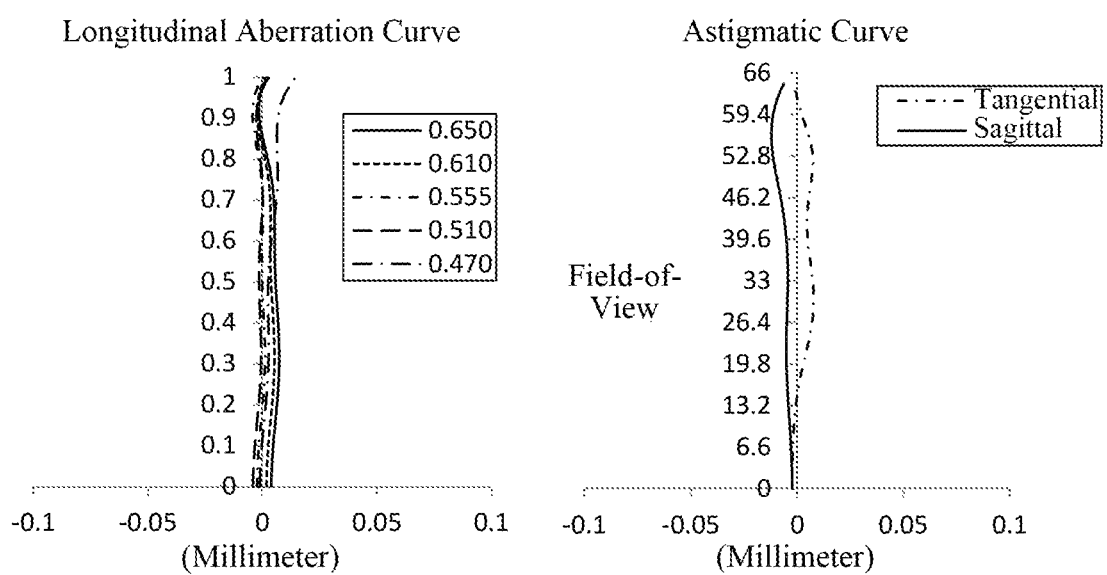
FIGS. 10A to 10D show a longitudinal aberration curve, an astigmatic curve, a distortion curve, and a lateral color curve, respectively, of the optical imaging system of Example 5.
Figure 10C:
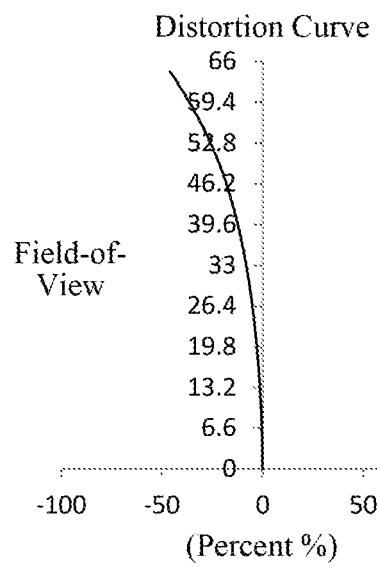
Figure 10D:
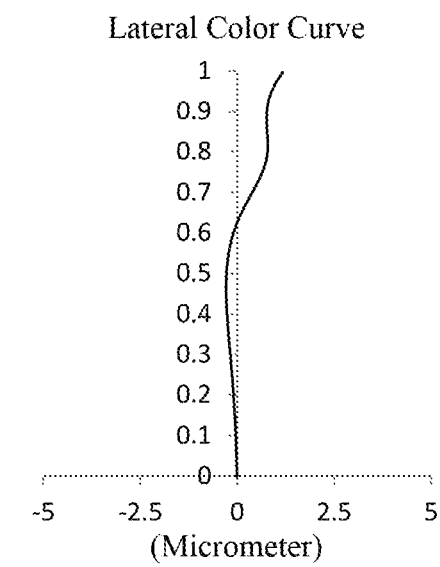

FIG. 10A shows a longitudinal aberration curve of the optical imaging system of Example 5, which represents the focus deviation of light with different wavelengths after passing through the system. FIG. 10B shows an astigmatic curve of the optical imaging system of Example 5, which represents a curvature of a tangential plane and a curvature The first lens E1 has a negative refractive power, an object-side surface S1 thereof is convex and an image-side surface S2 thereof is concave. The second lens E2 has a positive refractive power, an object-side surface S3 thereof is convex and an image-side surface S4 thereof is convex. The third lens E3 has a positive refractive power, an object-side surface S5 thereof is convex and an image-side surface S6 thereof is convex. The fourth lens E4 has a negative refractive power, an object-side surface S7 thereof is concave and an image-side surface S8 thereof is concave. The fifth lens E5 has a positive refractive power, an object-side surface S9 thereof is convex and an image-side surface S10 thereof is convex. The sixth lens E6 has a negative refractive power, an object-side surface S11 thereof is convex and image-side surface S12 thereof is concave. The filter E7 has an object-side surface S13 and an image-side surface S14. The optical imaging system provided in the present examples has an imaging plane S15. Light from an object sequentially passes through each of the surfaces S1 to S14 and is finally imaged on the imaging plane S15.

In Example 6, the value of the effective focal length f of the optical imaging system is 2.11 mm, the ratio of the effective focal length f to the entrance pupil diameter EPD is 2.40, the value of the distance TTL along the optical axis from the object-side surface of the first lens to the imaging plane is 8.08 mm, the value of half of a diagonal length ImgH of the effective pixel area on the imaging plane is 3.02 mm, and the value of half of a maximum field-of-view Semi-FOV is 65.0°.

Table 11 shows a table of basic parameters of the optical imaging system of Example 6, wherein the radius of curvature, the thickness and the focal length are all in units of millimeters (mm). Table 12 shows the high-order term coefficients that can be applicable to each aspheric mirror in Example 6, wherein each aspheric profile can be defined by Equation (1) given in Example 1 above.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 8.9458 | 0.7826 | 1.54 | 55.9 | −3.14 | 3.8148 |
| S2 | Aspheric | 1.3753 | 1.1685 | | | | −0.4096 |
| S3 | Aspheric | 5.5592 | 0.9895 | 1.65 | 23.5 | 7.37 | 6.0059 |
| S4 | Aspheric | −30.4683 | 0.3951 | | | | 80.0000 |
| STO | Spherical | Infinite | −0.0405 | | | | |
| S5 | Aspheric | 3.2198 | 0.8266 | 1.55 | 56.1 | 2.61 | −1.6414 |
| S6 | Aspheric | −2.3176 | 0.1614 | | | | 0.1440 |
| S7 | Aspheric | −5.7258 | 0.3900 | 1.67 | 19.2 | −3.57 | 8.4358 |
| S8 | Aspheric | 4.3035 | 0.1314 | | | | −78.0931 |
| S9 | Aspheric | 2.6581 | 0.9885 | 1.55 | 56.1 | 3.00 | −24.9618 |
| S10 | Aspheric | −3.7067 | 0.6050 | | | | 2.7631 |
| S11 | Aspheric | 2.4056 | 0.5984 | 1.54 | 55.9 | −6.38 | −15.7618 |
| S12 | Aspheric | 1.2899 | 0.3249 | | | | −5.3132 |
| S13 | Spherical | Infinite | 0.2100 | 1.52 | 64.2 | | |
| S14 | Spherical | Infinite | 0.5451 | | | | |
| S15 | Spherical | Infinite | | | | | |

TABLE 12

| Surface number | A4 | A6 | A8 | A10 | A12 | A14 | A16 |
|---|---|---|---|---|---|---|---|
| S1 | 2.7910E−02 | −6.9558E−03 | 6.9319E−04 | −2.6318E−05 | 0.0000E+00 | 0.0000E+00 | 0.0000E+00 |
| S2 | 6.2829E−02 | 8.6034E−03 | −7.1324E−03 | −3.7048E−03 | 8.6852E−04 | 0.0000E+00 | 0.0000E+00 |
| S3 | −1.7696E−02 | 1.1461E−03 | −1.3451E−02 | 7.2493E−03 | −1.0390E−03 | 0.0000E+00 | 0.0000E+00 |
| S4 | 1.1640E−02 | −1.8732E−02 | 2.2484E−02 | −4.2434E−03 | 6.9669E−04 | 0.0000E+00 | 0.0000E+00 |
| S5 | 8.0095E−03 | 1.0390E−02 | −1.1303E−02 | 0.0000E+00 | 0.0000E+00 | 0.0000E+00 | 0.0000E+00 |
| S6 | −1.1718E−01 | 2.9214E−02 | −8.7733E−02 | 4.4374E−02 | −3.6616E−02 | 0.0000E+00 | 0.0000E+00 |
| S7 | −2.3118E−01 | 1.6650E−01 | −1.7217E−01 | 5.9374E−02 | 2.8929E−02 | 0.0000E+00 | 0.0000E+00 |
| S8 | −1.4082E−01 | 1.4578E−01 | −1.1380E−01 | 6.0635E−02 | −1.1381E−02 | 0.0000E+00 | 0.0000E+00 |
| S9 | −1.1808E−02 | 8.4195E−04 | 8.5251E−04 | −3.0533E−02 | 9.7618E−04 | 0.0000E+00 | 0.0000E+00 |
| S10 | −4.7157E−02 | 6.5693E−02 | −5.3203E−02 | 2.7786E−02 | −8.4392E−03 | 1.1402E−03 | 0.0000E+00 |
| S11 | −1.9625E−01 | 3.1719E−02 | −1.4429E−02 | 6.9034E−03 | −8.4533E−04 | 0.0000E+00 | 0.0000E+00 |
| S12 | −8.1140E−02 | 2.6070E−02 | −6.4182E−03 | 8.3861E−04 | −4.3705E−05 | 0.0000E+00 | 0.0000E+00 |

Figure 12A:
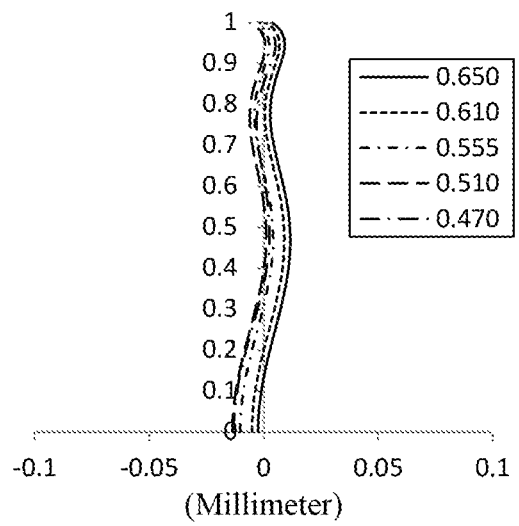
FIGS. 12A to 12D show a longitudinal aberration curve, an astigmatic curve, a distortion curve, and a lateral color curve, respectively, of the optical imaging system of Example 6.
Figure 12B:
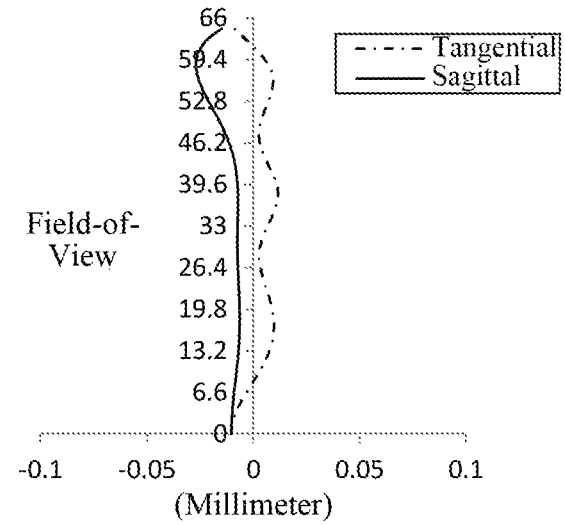
Figure 12C:
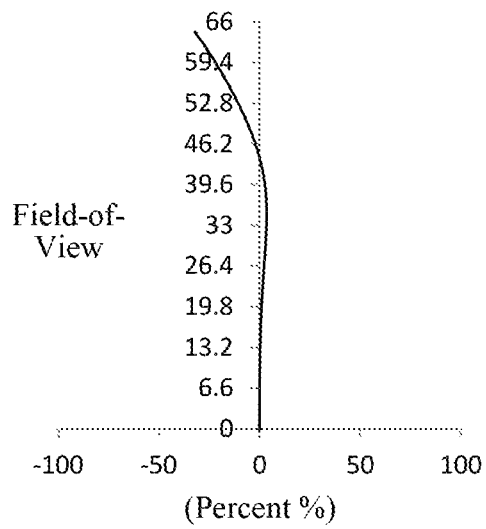
Figure 12D:
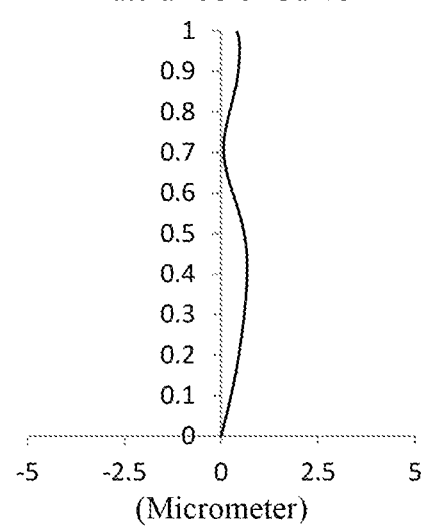

FIG. 12A shows a longitudinal aberration curve of the optical imaging system of Example 6, which represents the focus deviation of light with different wavelengths after passing through the system. FIG. 12B shows an astigmatic curve of the optical imaging system of Example 6, which represents a curvature of a tangential plane and a curvature of a sagittal plane. FIG. 12C shows a distortion curve of the optical imaging system of Example 6, which represents magnitude of distortion corresponding to different field-of-views. FIG. 12D shows a lateral color curve of the optical imaging system of Example 6, which represents deviations of different image height on the imaging plane after light passes through the system. As can be seen from FIGS. 12A to 12D, the optical imaging system according to Example 6 can achieve good imaging quality.

In view of the above, Examples 1 to 6 satisfy the relationships shown in Table 13, respectively.

TABLE 13

| | Example | | | | | |
|---|---|---|---|---|---|---|
| Conditional | 1 | 2 | 3 | 4 | 5 | 6 |
| f/ImgH | 0.70 | 0.65 | 0.93 | 0.67 | 0.88 | 0.70 |
| DT12/DT62 | 0.61 | 0.57 | 0.56 | 0.61 | 0.75 | 0.61 |

TABLE 13-continued

| Conditional | Example | | | | | |
|---|---|---|---|---|---|---|
| | 1 | 2 | 3 | 4 | 5 | 6 |
| f/f1 | −0.62 | −0.68 | −0.71 | −0.69 | −0.71 | −0.67 |
| f/f3 − f/f2 | 0.89 | 0.90 | 0.66 | 0.71 | 0.60 | 0.52 |
| f/f2345 | 0.90 | 1.00 | 1.10 | 0.88 | 0.95 | 0.93 |
| f5/f4 | −0.69 | −0.59 | −0.73 | −0.90 | −0.72 | −0.84 |
| f/(R3 − R2) | 0.51 | 0.82 | 0.43 | 0.92 | 0.43 | 0.50 |
| R5/(R5 − R6) | 0.35 | 0.23 | 0.26 | 0.38 | 0.30 | 0.58 |
| R7/(R7 + R10) | 0.82 | 0.89 | 0.85 | 0.54 | 0.80 | 0.61 |
| R12/f | 0.49 | 0.48 | 0.48 | 0.48 | 0.96 | 0.61 |
| CT1/CT2 | 0.51 | 0.47 | 0.50 | 0.43 | 0.55 | 0.79 |
| (CT3 + CT4)/ΣAT | 0.52 | 0.72 | 0.52 | 0.60 | 0.49 | 0.50 |
| T56/(CT5 + CT6) | 0.43 | 0.35 | 0.53 | 0.46 | 0.47 | 0.38 |
| SAG41/SAG52 | 0.40 | 0.41 | 0.35 | 0.55 | 0.34 | 0.48 |
| SAG12/ET1 | 0.84 | 0.91 | 0.74 | 0.75 | 0.83 | 0.94 |
| ET3/ET2 | 0.29 | 0.45 | 0.40 | 0.32 | 0.38 | 0.53 |

The present disclosure also provides an imaging device provided with an electronic photosensitive element for imaging, which may be a photosensitive coupling element (CCD) or a complementary metal oxide semiconductor element (CMOS). The imaging device may be an independent imaging device such as a digital camera, or may be an imaging module integrated on a mobile electronic device such as a mobile phone. The imaging device is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, comprising:
   a first lens having a negative refractive power, and an image-side surface of the first lens being concave;
   a second lens having a positive refractive power;
   a third lens having a positive refractive power, and an object-side surface of the third lens being convex and an image-side surface of the third lens being convex;
   a fourth lens having a negative refractive power;
   a fifth lens having a positive refractive power, and an image-side surface of the fifth lens being convex; and
   a sixth lens having a negative refractive power;
   wherein half of a maximum field-of-view Semi-FOV of the optical imaging system satisfies Semi-FOV>60°; and
   wherein a maximum effective radius DT12 of the image-side surface of the first lens and a maximum effective radius DT62 of an image-side surface of the sixth lens satisfy 0.5<DT12/DT62<1;
   wherein an on-axis distance SAG12 from an intersection of the image-side surface of the first lens and the optical axis to a vertex of an effective radius of the image-side surface of the first lens, and an edge thickness ET1 of the first lens satisfy: 0.5<SAG12/ET1<1.

2. The optical imaging system according to claim 1, wherein an effective focal length f of the optical imaging system and an effective focal length f1 of the first lens satisfy −1<f/f1<−0.5.

3. The optical imaging system according to claim 1, wherein an effective focal length f of the optical imaging system, an effective focal length f2 of the second lens, and an effective focal length f3 of the third lens satisfy 0.5<f/f3−f/f2<1.

4. The optical imaging system according to claim 1, wherein an effective focal length f of the optical imaging system and a combined focal length f2345 of the second lens, the third lens, the fourth lens and the fifth lens satisfy 0.5<f/f2345<1.5.

5. The optical imaging system according to claim 1, wherein an effective focal length f4 of the fourth lens and an effective focal length f5 of the fifth lens satisfy −1<f5/f4<−0.5.

6. The optical imaging system according to claim 1, wherein an effective focal length f of the optical imaging system, a radius of curvature R2 of the image-side surface of the first lens, and a radius of curvature R3 of an object-side surface of the second lens satisfy 0.2<f/(R3−R2)<1.2.

7. The optical imaging system according to claim 1, wherein a radius of curvature R5 of the object-side surface of the third lens and a radius of curvature R6 of the image-side surface of the third lens satisfy 0.2<R5/(R5−R6)<0.7.

8. The optical imaging system according to claim 1, wherein a radius of curvature R7 of an object-side surface of the fourth lens and a radius of curvature R10 of the image-side surface of the fifth lens satisfy 0.5<R7/(R7+R10)<1.

9. The optical imaging system according to claim 1, wherein an effective focal length f of the optical imaging system and a radius of curvature R12 of an image-side surface of the sixth lens satisfy 0.2<R12/f<1.2.

10. The optical imaging system according to claim 1, wherein a center thickness CT1 of the first lens along the optical axis and a center thickness CT2 of the second lens along the optical axis satisfy 0.3<CT1/CT2<0.8.

11. The optical imaging system according to claim 1, wherein a center thickness CT3 of the third lens along the optical axis, a center thickness CT4 of the fourth lens along the optical axis, and a sum ΣAT of spaced intervals between each two adjacent lenses of the first lens to the sixth lens along the optical axis satisfy 0.3<(CT3+CT4)/ΣAT<0.8.

12. The optical imaging system according to claim 1, wherein a center thickness CT5 of the fifth lens along the optical axis, a center thickness CT6 of the sixth lens along the optical axis, and a spaced interval T56 between the fifth lens and the sixth lens along the optical axis satisfy 0.2<T56/(CT5+CT6)<0.7.

13. An optical imaging system, sequentially from an object side to an image side of the optical imaging system along an optical axis, comprising:
   a first lens having a negative refractive power, and an image-side surface of the first lens being concave;
   a second lens having a positive refractive power, and an object-side surface of the second lens being convex;
   a third lens having a positive refractive power, and an object-side surface of the third lens being convex and an image-side surface of the third lens being convex;
   a fourth lens having a negative refractive power, and an object-side surface of the fourth lens being concave;
   a fifth lens having a positive refractive power, and an image-side surface of the fifth lens being convex; and
   a sixth lens having a negative refractive power;

wherein half of a maximum field-of-view Semi-FOV of the optical imaging system satisfies Semi-FOV>60°; and an effective focal length f of the optical imaging system and half of a diagonal length ImgH of an effective pixel region on an imaging plane of the optical imaging system satisfy f/ImgH>0.6;

wherein an on-axis distance SAG12 from an intersection of the image-side surface of the first lens and the optical axis to a vertex of an effective radius of the image-side surface of the first lens, and an edge thickness ET1 of the first lens satisfy: 0.5<SAG12/ET1<1.

14. The optical imaging system according to claim 13, wherein an on-axis distance SAG41 from an intersection of the object-side surface of the fourth lens and the optical axis to a vertex of an effective radius of the object-side surface of the fourth lens and an on-axis distance SAG52 from an intersection of the image-side surface of the fifth lens and the optical axis to a vertex of an effective radius of the image-side surface of the fifth lens satisfy 0.2<SAG41/SAG52<0.7.

15. The optical imaging system according to claim 13, wherein an edge thickness ET2 of the second lens and an edge thickness ET3 of the third lens satisfy 0.2<ET3/ET2<0.7.

16. The optical imaging system according to claim 13, wherein an effective focal length f of the optical imaging system and an effective focal length f1 of the first lens satisfy −1<f/f1<−0.5.

17. The optical imaging system according to claim 13, wherein an effective focal length f of the optical imaging system, an effective focal length f2 of the second lens, and an effective focal length f3 of the third lens satisfy 0.5<f/f3−f/f2<1.

18. The optical imaging system according to claim 13, wherein an effective focal length f of the optical imaging system and a combined focal length f2345 of the second lens, the third lens, the fourth lens and the fifth lens satisfy 0.5<f/f2345<1.5.

* * * * *